US010364869B2

(12) United States Patent
Kurematsu et al.

(10) Patent No.: US 10,364,869 B2
(45) Date of Patent: Jul. 30, 2019

(54) CHAIN GUIDE

(71) Applicant: TSUBAKIMOTO CHAIN CO., Osaka-shi, Osaka (JP)

(72) Inventors: Yuji Kurematsu, Osaka (JP); Katsuya Nakakubo, Osaka (JP); Takeshi Ogawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 410 days.

(21) Appl. No.: 14/166,986

(22) Filed: Jan. 29, 2014

(65) Prior Publication Data
US 2014/0243132 A1 Aug. 28, 2014

(30) Foreign Application Priority Data

Feb. 22, 2013 (JP) ................................. 2013-033674

(51) Int. Cl.
*F16H 7/18* (2006.01)
(52) U.S. Cl.
CPC ..................................... *F16H 7/18* (2013.01)
(58) Field of Classification Search
CPC ...... F16H 7/18; F16H 7/08; F16H 2007/0802; F16H 2007/0819; F16H 2007/0863; F16H 2007/0872; F16H 2007/0874; F16H 2007/0889; F16H 2007/0893; F16H 2007/185

See application file for complete search history.

(56) References Cited

U.S. PATENT DOCUMENTS

| | | | | |
|---|---|---|---|---|
| 6,120,403 A * | 9/2000 | Suzuki | ................... | F16C 11/04 474/111 |
| 6,322,471 B1 * | 11/2001 | Hashimoto | ............... | F16H 7/18 474/101 |
| 6,612,952 B1 * | 9/2003 | Simpson | ................... | F16H 7/08 474/111 |
| 2002/0128100 A1 * | 9/2002 | Inoue | ....................... | F16H 7/18 474/111 |
| 2002/0132688 A1 * | 9/2002 | Ono | .......................... | F16H 7/18 474/111 |

(Continued)

FOREIGN PATENT DOCUMENTS

| | | |
|---|---|---|
| JP | 10-89428 A | 4/1998 |
| JP | 2006-250208 A | 9/2006 |

(Continued)

*Primary Examiner* — Michael R Mansen
*Assistant Examiner* — Juan J Campos, Jr.
(74) *Attorney, Agent, or Firm* — Westerman, Hattori, Daniels & Adrian, LLP

(57) ABSTRACT

There is provided a chain guide that reduces a space occupied by the chain guide in an engine room while maintaining required strength, rigidity, and durability with a simple configuration, reduces the number of manufacturing steps and the waste of a material, does not require a structure that permits an error, prevents increases in vibration and noise during use, and reduces the burden of a maintenance operation. The chain guide has a guide shoe and a base member that reinforces the guide shoe, and an attachment portion includes an attachment member that is provided separately from the guide shoe and the base member and can be fixed to at least one of the guide shoe and the base member or both of the guide shoe and the base member.

19 Claims, 39 Drawing Sheets

(56) References Cited

U.S. PATENT DOCUMENTS

| | | | |
|---|---|---|---|
| 2003/0134704 A1* | 7/2003 | Konno | F01L 1/024 |
| | | | 474/111 |
| 2006/0040774 A1* | 2/2006 | Hirayama | F16H 7/18 |
| | | | 474/111 |
| 2006/0199689 A1* | 9/2006 | Yoshimoto | F16H 7/18 |
| | | | 474/111 |
| 2006/0205548 A1 | 9/2006 | Konno | |
| 2007/0029696 A1 | 2/2007 | Kurematsu et al. | |
| 2011/0251002 A1 | 10/2011 | Mori et al. | |
| 2014/0057749 A1* | 2/2014 | Konno | F16H 7/18 |
| | | | 474/111 |

FOREIGN PATENT DOCUMENTS

| | | |
|---|---|---|
| JP | 2011-220457 A | 4/2011 |
| WO | 2012/166358 A2 | 12/2012 |

* cited by examiner

Related Art

Related Art

Related Art

CHAIN GUIDE

BACKGROUND OF THE INVENTION

1. Field of the Invention

The present invention relates to a chain guide that includes a guide shoe that slides and guides a traveling chain, a base member that reinforces the guide shoe along a chain traveling direction, and at least one attachment portion.

2. Description of the Related Art

Conventionally, it is common to use a chain guide including a guide shoe that slides and guides a traveling chain in order to stabilize the chain traveling between sprockets and properly maintain its tension.

For example, as shown in FIG. 64, there is known a timing system of an engine that drives a transmission chain CH such as a roller chain that is endlessly wound around sprockets S1 and S2 provided in a crankshaft and a camshaft in an engine room in which the timing chain CH is endlessly wound around the driving sprocket S1 attached to the crankshaft in the engine room E and a pair of the driven sprockets S2 attached to the camshaft therein, and the timing chain CH is guided by a chain guide 600 (pivoting guide) and a chain guide 500 (fixed guide).

In the known timing system, the chain guide 500 (fixed guide) is fixed in the engine room E with two attachment shafts B1 and B2, and the chain guide 600 (pivoting guide) is attached in the engine room so as to be pivotable about a pivot shaft B0 within a plane of surrounding of the timing chain CH.

A chain tensioner T properly maintains the tension of the timing chain CH and also suppresses vibrations by pressing the chain guide 600 (pivoting guide).

In the chain guide used in the known timing system described above, a traveling guide portion is preferably formed of a material that is low in friction and resistant to wear, and the chain guide entirely formed of a low-friction resin material is known.

However, the chain guide needs some strength, rigidity, and durability for stably guiding the chain against the tension and vibration of the chain and, in a case where the chain guide is formed only of the resin material, it is necessary to increase the thickness and size of the material in order to obtain the required strength, rigidity, and durability so that a space occupied by the chain guide in the engine room is increased.

To cope with this, there is known a chain guide in which the occupied space is reduced while the strength, rigidity, and durability required by the entire chain guide are secured by forming the traveling guide portion with the low-friction resin material and reinforcing the resin material by using a material such as a metal that is high in strength, rigidity, and durability (see Japanese Patent Application Laid-open No. H10-89428 and the like).

For example, as shown in FIGS. 65 to 67, the known chain guide 500 (fixed guide) described in Japanese Patent Application Laid-open No. H10-89428 includes a guide shoe 510 formed of the resin that slides and guides the traveling chain and a base member 520 formed of a plate-like metal that reinforces the guide shoe 510 along the chain traveling direction.

The base member 520 includes a shoe support portion 521 that extends in the chain traveling direction and attachment portions 522 that are disposed at positions spaced apart from each other in the chain traveling direction and extend vertically, and the base member 520 is formed from one metal plate by bending the attachment portions 522 disposed at two positions by 90° with respect to the shoe support portion 521.

The attachment portions 522 at two positions are provided with attachment holes 523 through which bolts and the like are extended.

A traveling guide portion 511 of the guide shoe 510 is supported by the shoe support portion 521 of the base member 520, and the guide shoe 510 can be attached to and detached from the base member 520 by engagement and disengagement of end engaging pieces 512 at both ends in the chain traveling direction and a plurality of side engaging pieces 513 provided at appropriate positions in a width direction with and from the shoe support portion 521.

In the known chain guide described above, since the shoe support portion 521 and the attachment portions 522 at two positions of the base member 520 are formed by bending the same metal plate at two positions by 90°, one metal plate needs to be bent at two positions or more so that a problem has arisen in that the number of manufacturing steps is increased.

In addition, since the shoe support portion 521 and the attachment portions 522 at two positions are constituted by the same metal plate, a problem has arisen in that a large amount of the metal material is required and, since the contour of the base member 520 has many protrusions when the base member 520 is manufactured from one metal plate by punching or the like, a problem has arisen in that the waste of the material is increased.

Further, even in a case where only the positions of the attachment shafts B1 and B2 are changed with the other conditions remaining unchanged, it is necessary to design the base member 520 having a totally different shape, change the shape of the metal plate obtained by punching when the base member 520 is manufactured from one metal plate by punching or the like, and change the positions of bending so that a problem has arisen in that versatility is low in a case where the design of an attachment target is changed or in a case where the chain guide is applied to various attachment targets, and, as a result, manufacturing cost is increased.

Furthermore, in a case where the attachment portion is formed in the base member, it is necessary to use the same material for both of them and make the thicknesses thereof equal to each other so that a problem has arisen in that it is difficult to optimize the design of each of the attachment portion and the base member, and the material cost cannot be reduced.

SUMMARY OF THE INVENTION

The present invention is intended to solve the above-described problems by separating the attachment portion from the guide shoe and the base member instead of providing the attachment portion in the guide shoe or the base member in the chain guide that is attached using the attachment portion, and an object thereof is to provide the chain guide capable of reducing the occupied space in the engine room while maintaining required strength, rigidity, and durability with a simple configuration, and reducing the manufacturing cost by reducing the number of manufacturing steps and the waste of the material and enhancing versatility.

The chain guide according to the present invention is a chain guide including a guide shoe that slides and guides a traveling chain, a base member that reinforces the guide shoe along a chain traveling direction, and at least one attachment portion, wherein the attachment portion includes an attachment member that is provided separately from the guide shoe and the base member and can be fixed to at least one of the guide shoe and the base member or both of the guide shoe and the base member, whereby the above-described problems are solved.

According to the chain guide of a first aspect of the present invention, it becomes possible to reduce a space occupied by the chain guide by forming the base member contributing to strength, rigidity, and durability by using a material different from that of the guide shoe. In addition, the attachment portion is separate from the guide shoe and the base member and the attachment portion includes the attachment member that can be fixed to at least one of the guide shoe and the base member, whereby it is possible to select the optimum shapes and materials for the guide shoe, the base member, and the attachment member individually, and hence it is possible to reduce manufacturing cost while sufficiently securing strength, rigidity, and durability required by the entire chain guide.

Further, it is not necessary to work the base member such as bending the base member or the like so that it is possible to reduce the number of working steps, and it is possible to form the contour of the base member into a shape having few protrusions so that the manufacture of the base member is facilitated, and it is possible to reduce the waste of the material when the base member is manufactured from one metal plate by punching or the like.

Furthermore, even in a case where the design of the attachment target is changed or in a case where the chain guide is applied to various attachment targets, it is possible to cope with the case by changing only the attachment member that is separate from the guide shoe and the base member so that it is possible to enhance versatility and reduce the manufacturing cost.

According to the configuration of a second aspect of the present invention, the guide shoe is formed of a synthetic resin material, whereby it is possible to make a traveling guide portion low in friction, and molding is facilitated. In addition, the base member is formed of a metal material, whereby it is possible to sufficiently secure the strength, rigidity, and durability while further reducing the occupied space.

According to the configuration of a third aspect of the present invention, a fixing piece is fixed to at least one of the guide shoe and the base member, whereby the separate attachment member is fixed to the guide shoe with necessary and sufficient firmness, and hence it is possible to sufficiently secure the strength, rigidity, and durability required by the entire chain guide.

According to the configuration of a fourth aspect of the present invention, the fixing piece is formed so as to hold at least one of the guide shoe and the base member between the fixing pieces, whereby the attachment member is fixed to the guide shoe more firmly.

According to the configuration of a fifth aspect of the present invention, at least one of the guide shoe and the base member is formed so as to hold the fixing piece, whereby the attachment member is fixed to the guide shoe more sufficiently.

According to the configuration of a sixth aspect of the present invention, one of the attachment member and the base member has a fixing hole, and the other of the attachment member and the base member has a fixing protrusion that is inserted into the fixing hole, whereby it becomes possible to reliably fix the attachment member and the base member to each other with the simple configuration.

In addition, it is possible to simplify the shape of each of the attachment member and the base member and minimize the size thereof, the material can be saved, and the attachment member and the base member can be provided at the same time during the manufacture such as, e.g., punching or the like so that secondary working is not required and it is possible to reduce the manufacturing cost.

According to the configuration of a seventh aspect of the present invention, the attachment member is integrated with the guide shoe when the guide shoe is manufactured, whereby it is possible to reduce or omit the step of fixing the attachment member to reduce the manufacturing cost.

According to the configuration of an eighth aspect of the present invention, the attachment member is formed by combining a plurality of components, whereby, even in a case where the entire attachment member is formed into a complex shape, it is possible to form the individual components into simple shapes, and hence it is possible to reduce the manufacturing cost and reliably fix the attachment member to the base member.

According to the configuration of a ninth aspect of the present invention, the base member is formed of a plate-like material and has a bead, whereby it becomes possible to sufficiently secure required strength, rigidity, and durability even with an inexpensive material or a thin material to further reduce the manufacturing cost.

In addition, since the attachment member is separate, it is not necessary to secure strength required for forming the attachment portion in the base member itself, and bending or the like for forming the attachment portion in the base member is not required, and hence it is possible to arbitrarily set the optimum shape of the bead, and form the base member with an inexpensive material or a thin material.

Further, the bead can be formed at the same time when the base member is manufactured from one metal plate by punching or the like, and hence it is possible to form the bead without increasing the number of working steps.

According to the configuration of a tenth aspect of the present invention, the attachment member is formed of the plate-like material and has the bead, whereby it becomes possible to sufficiently secure required strength, rigidity, and durability even with an inexpensive material or a thin material to further reduce the manufacturing cost.

According to the configuration of an eleventh aspect of the present invention, it is possible to arbitrarily adjust or set the interval between the guide shoe or the base member to which the attachment member is fixed and the attachment portion formed integrally with the base member or the guide shoe, easily absorb an error with respect to the dimension of an object to which the chain guide is attached such as an engine or the like, and facilitate an attachment operation.

In addition, when the base member or the guide shoe expands or contracts in response to changes in temperature, or deforms due to changes in the tension of a chain or vibrations during use, it becomes possible to rectify the expansion, contraction, or deformation by relatively displacing a force applied in a chain traveling direction so that an intensive stress is not applied to a specific portion, and it is possible to further improve durability.

In addition, the intensive stress is not applied to each attachment portion so that it is possible to reliably prevent loosening of fixation, prevent increases in vibration and noise during use, and reduce the burden of a maintenance operation.

DESCRIPTION OF THE PREFERRED EMBODIMENTS

Figure 1:
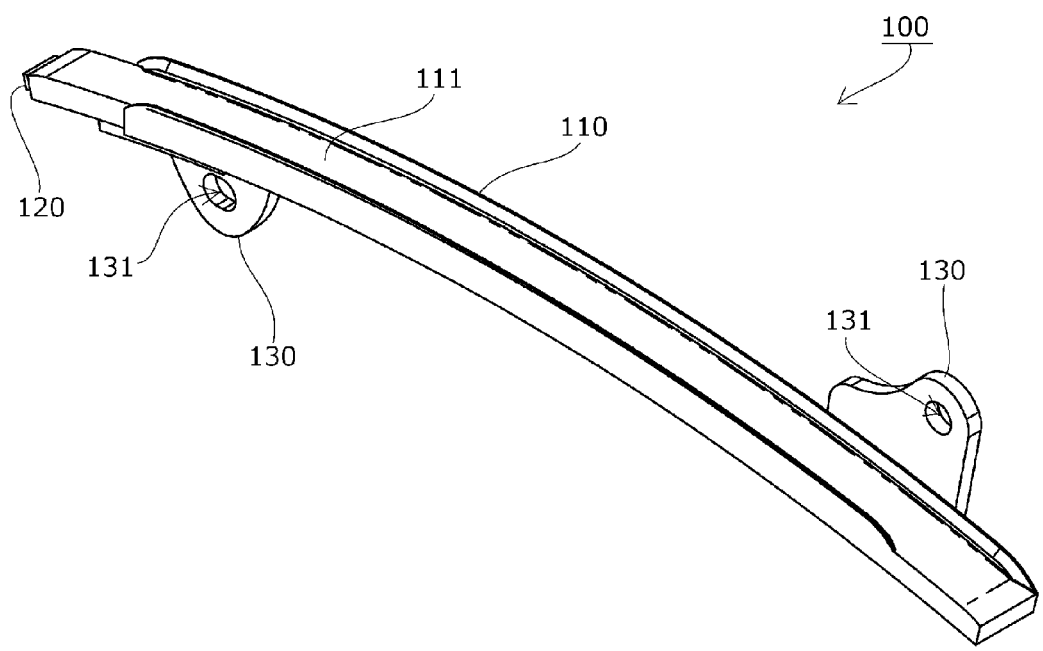
FIG. 1 is a perspective view of a chain guide according to a first embodiment of the present invention as viewed from above.
Figure 2:
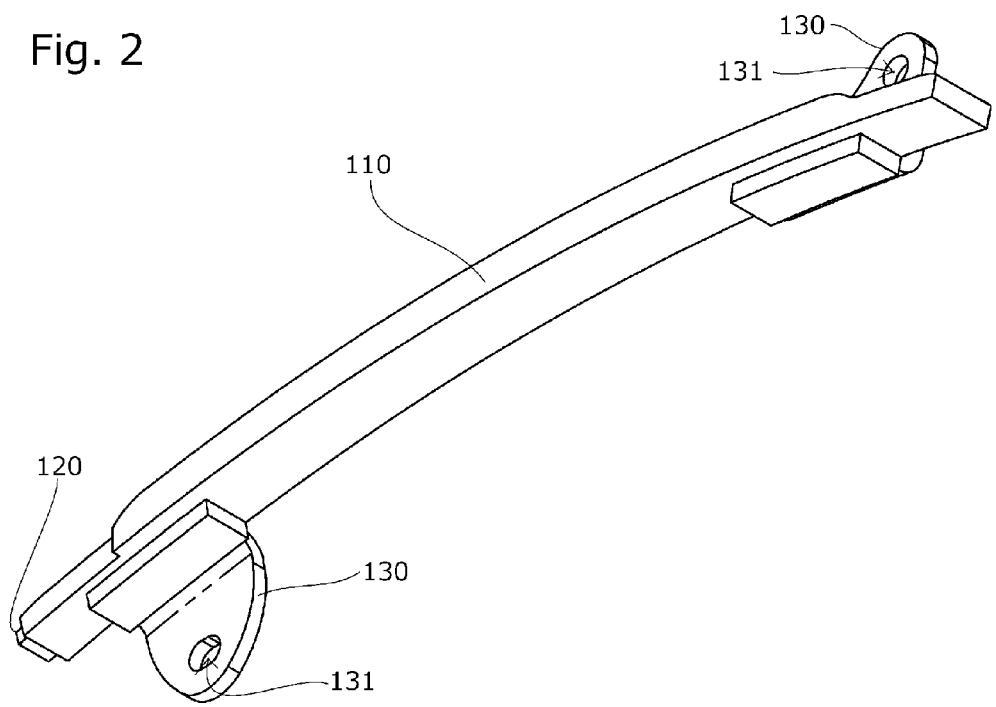
FIG. 2 is a perspective view of the chain guide according to the first embodiment of the present invention as viewed from below.
Figure 3:
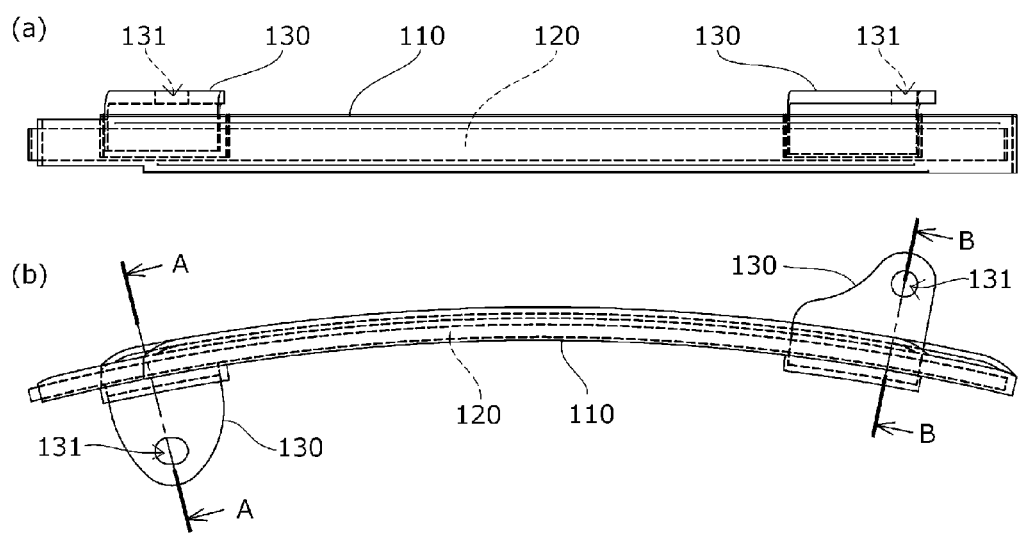
FIG. 3A is a plan view of the chain guide according to the first embodiment of the present invention.
FIG. 3B is a front view thereof.
Figure 4:
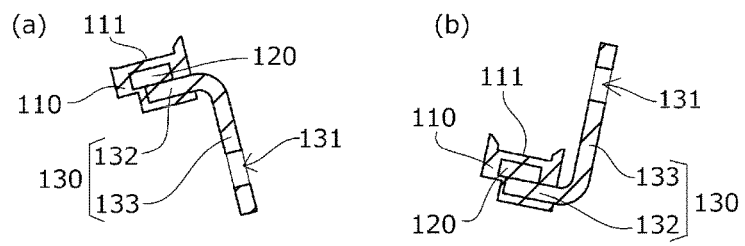
FIG. 4A is a cross-sectional view taken along the line A-A of FIG. 3B.
FIG. 4B is a cross-sectional view taken along the line B-B of FIG. 3B.
Figure 5:
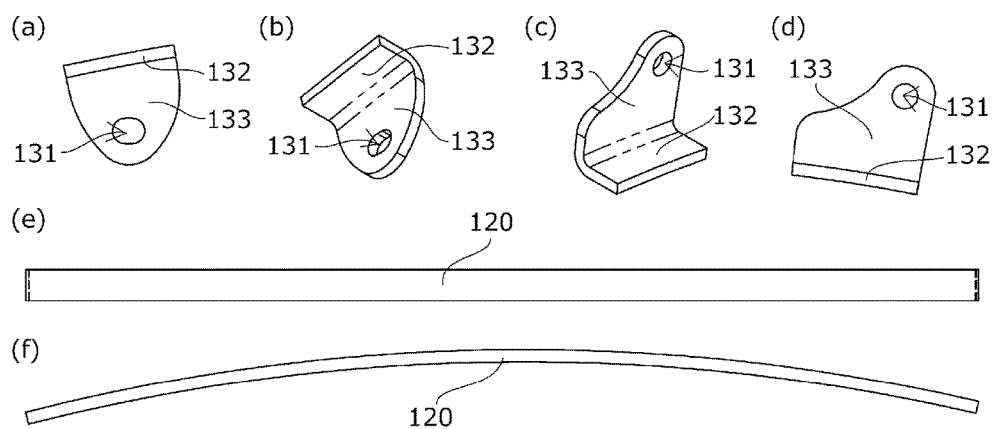
FIG. 5A is a front view of one attachment member of the chain guide according to the first embodiment of the present invention.
FIG. 5B is a perspective view of one attachment member thereof.
FIG. 5C is a perspective view of the other attachment member thereof.
FIG. 5D is a front view of the other attachment member thereof.
FIG. 5E is a plan view of a base member thereof.
FIG. 5F is a side view of the base member thereof.

The present invention is based on a technical idea that a structure is adopted in which a plurality of attachment portions are provided not in one member but in a plurality of members separately when a chain guide is constituted by the plurality of members and is fixed by the plurality of attachment portions, and the specific configuration of a chain guide according to the present invention may be any configuration as long as the chain guide includes a guide shoe that slides and guides a traveling chain and a base member that reinforces the guide shoe along a chain traveling direction, the base member has a shoe support portion that extends in the chain traveling direction and a base attachment portion that extends in a direction vertical to the chain traveling direction, the guide shoe has a traveling guide portion that extends in the chain traveling direction and a guide shoe attachment portion that extends in the direction vertical to the chain traveling direction at a position spaced apart from the base attachment portion in the chain traveling direction, and the chain guide reduces a space occupied by the chain guide in an engine room while maintaining required strength, rigidity, and durability with a simple configuration, reduces the number of manufacturing steps and the waste of a material, does not require a structure that permits an error, and is capable of preventing increases in vibration and noise during use and reducing the burden of a maintenance operation.

Although the base member is desirably formed of a metal material and it is particularly preferable to manufacture the base member from a rolled steel sheet, a known appropriate material may be selected in accordance with various conditions such as rigidity, durability, moldability, and cost.

Although the material of the guide shoe is desirably synthetic resin, a known appropriate material may be selected in accordance with various conditions such as frictional resistance, rigidity, durability, moldability, and cost.

Although two attachment portions are provided in each of embodiments and modifications described later, only one attachment portion may be provided, or two attachment portions may be provided and different forms of the attachment portions of the embodiments and modifications may be combined appropriately.

Practical Example 1

A chain guide 100 (fixed guide) according to a first embodiment of the present invention will be described based on the drawings.

The chain guide 100 is intended to be applied to the above-described known timing system and, as shown in FIGS. 1 to 5, the chain guide 100 includes a guide shoe 110 that slides and guides a traveling chain and a base member 120 that reinforces the guide shoe 110 along a chain traveling direction.

The base member 120 extends in the chain traveling direction and has a predetermined shape that is curved along the chain traveling direction, and is formed, e.g., from one rolled steel sheet by punching.

Attachment members 130 are formed separately from the guide shoe 110 and the base member 120, and each of the attachment members 130 has an attachment portion 133 and a fixing piece 132 that is bent by 90° with respect to the attachment portion 133 and extends.

The attachment portion 133 is provided with an attachment hole 131 for fixation to an engine room or the like using a bolt or the like extended therethrough.

The guide shoe 110 has a traveling guide portion 111 that extends in the chain traveling direction, and the chain guide 100 in which the guide shoe 110, the base member 120, and the attachment members 130 are integrally fixed to each other is configured by forming the guide shoe 110 by injection molding or the like with the base member 120 and the fixing pieces 132 of the attachment members 130 inserted into the guide shoe 110.

With the configuration described above, it is possible to select the optimum shapes and materials for the guide shoe 110, the base member 120, and the attachment members 130 individually, and hence it is possible to reduce manufacturing cost while maintaining strength, rigidity, and durability required by the entire chain guide 100.

In addition, it is not necessary to work the base member 120 such as bending the base member 120 or the like so that it is possible to reduce the number of working steps, it is possible to form the contour of the base member 120 into the shape having few protrusions so that the manufacture of the base member 120 is facilitated, and it is possible to reduce the waste of the material when the base member 120 is manufactured from one metal plate by punching or the like.

Further, in the present embodiment, as shown in FIGS. 5E and 5F, the contour of the base member 120 has no projection or depression so that it is possible to use a metal bar formed by pultrusion or the like, and the base member 120 can be easily manufactured by a simple method such as cutting a long bar into an appropriate length and the like so that the manufacturing steps are simplified.

Furthermore, in the case where the bar is used, a burr resulting from cutting or punching does not exist on its longitudinal surface, and hence the contact surface of the guide shoe is not damaged by the burr or the like, and it is possible to prevent the occurrence of a crack or damage caused by a flaw during use.

In addition, in the present embodiment, although the right and left attachment members 130 shown in the drawings have the attachment portions 133 of different shapes and the directions of extension of the attachment portions 133 when they are integrally fixed to the guide shoe 110 and the base member 120 are different, the shapes and the like thereof can be freely designed according to the design of the engine room as the attachment target of the chain guide 100, and the chain guide 100 can be attached to various attachment targets by changing only the attachment members 130 so that it is possible to enhance versatility and reduce the manufacturing cost.

Further, the base member 120 and the fixing pieces 132 of the attachment members 130 may be fixed to each other by appropriate means such as spot welding or the like before the formation of the guide shoe 110, whereby the manufacture is facilitated, and it becomes possible to integrally fix the guide shoe 110, the base member 120, and the attachment members 130 to each other more firmly.

In the present embodiment, although a structure is adopted in which the attachment hole 131 of the attachment member 130 on the left in the drawings is formed so as to be elongated in the chain traveling direction, and the dimensional error in the interval between the two attachment members 130 or the interval between the chain guide and a fixation portion inside the engine and expansion and contraction caused by changes in temperature are thereby permitted, the attachment hole 131 of the right attachment member 130 may be elongated, both of the attachment holes 131 may be elongated, or none of them may be elongated in a case where the error can be absorbed by other structures.

Practical Example 2

Figure 6:
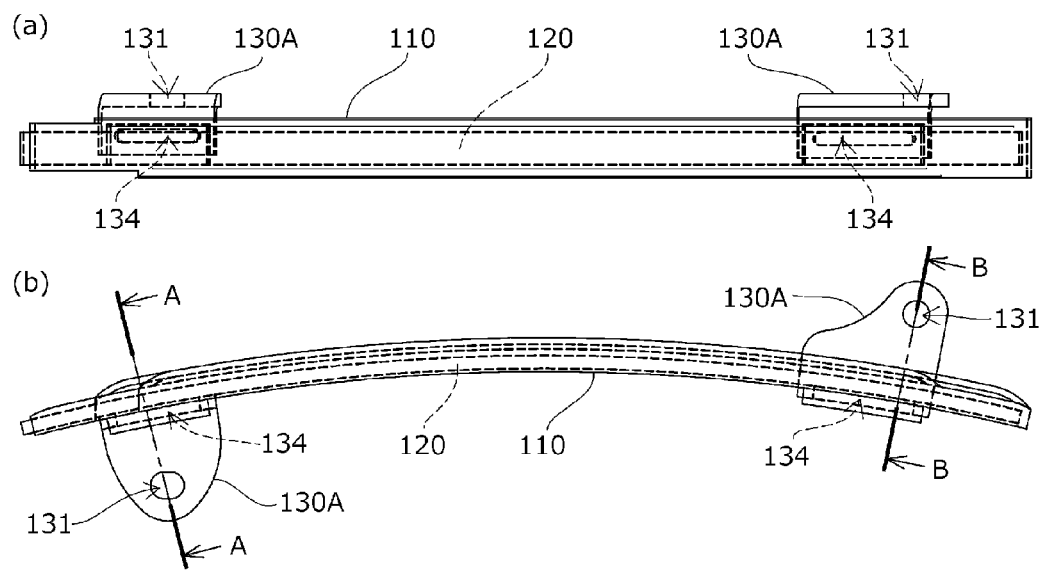
FIG. 6A is a plan view of a chain guide according to a modification of the first embodiment of the present invention.
FIG. 6B is a front view thereof.
Figure 7:
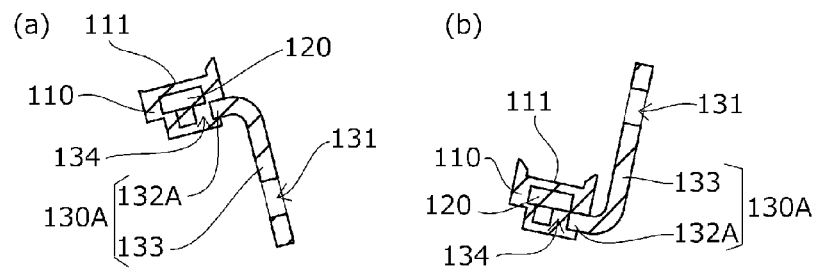
FIG. 7A is a cross-sectional view taken along the line A-A of FIG. 6B.
FIG. 7B is a cross-sectional view taken along the line B-B of FIG. 6B.
Figure 8:
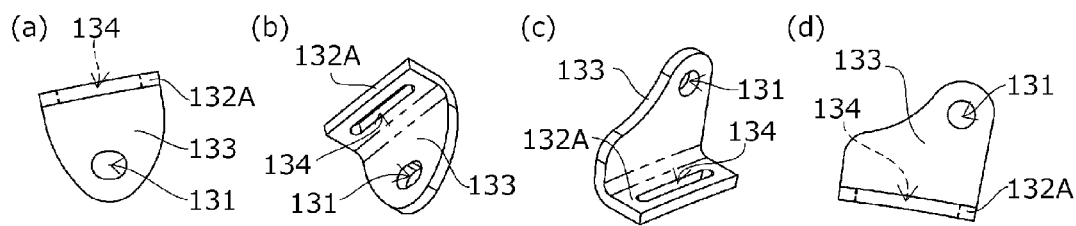
FIG. 8A is a front view of one attachment member of the chain guide according to the modification of the first embodiment of the present invention.
FIG. 8B is a perspective view of one attachment member thereof.
FIG. 8C is a perspective view of the other attachment member thereof.
FIG. 8D is a front view of the other attachment member thereof.
Figure 9:
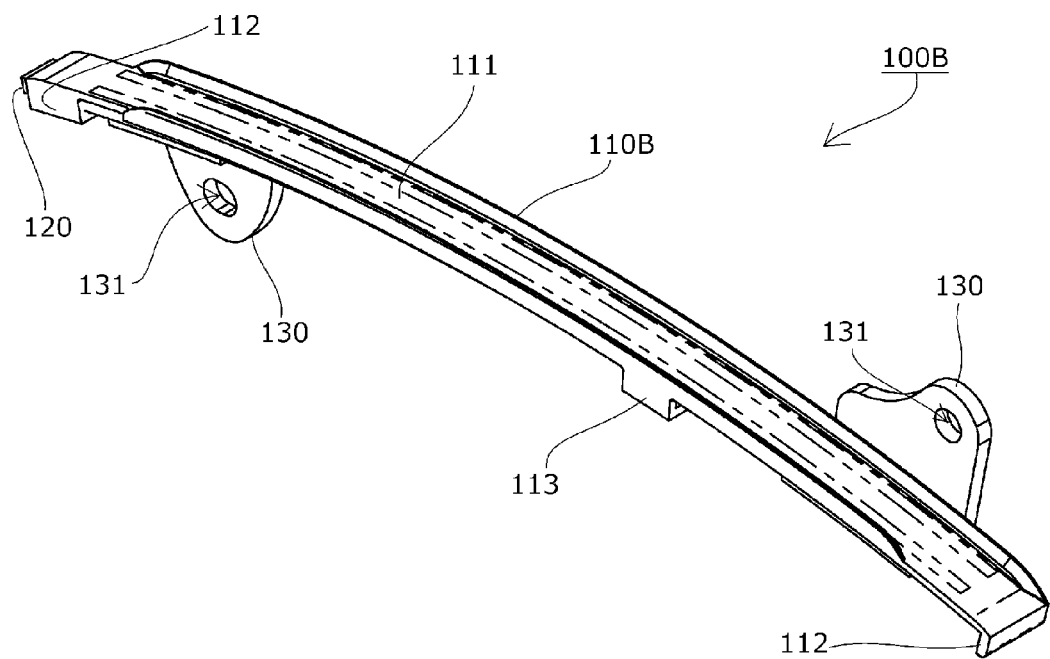
FIG. 9 is a perspective view of a chain guide according to another modification of the first embodiment of the present invention as viewed from above.
Figure 10:
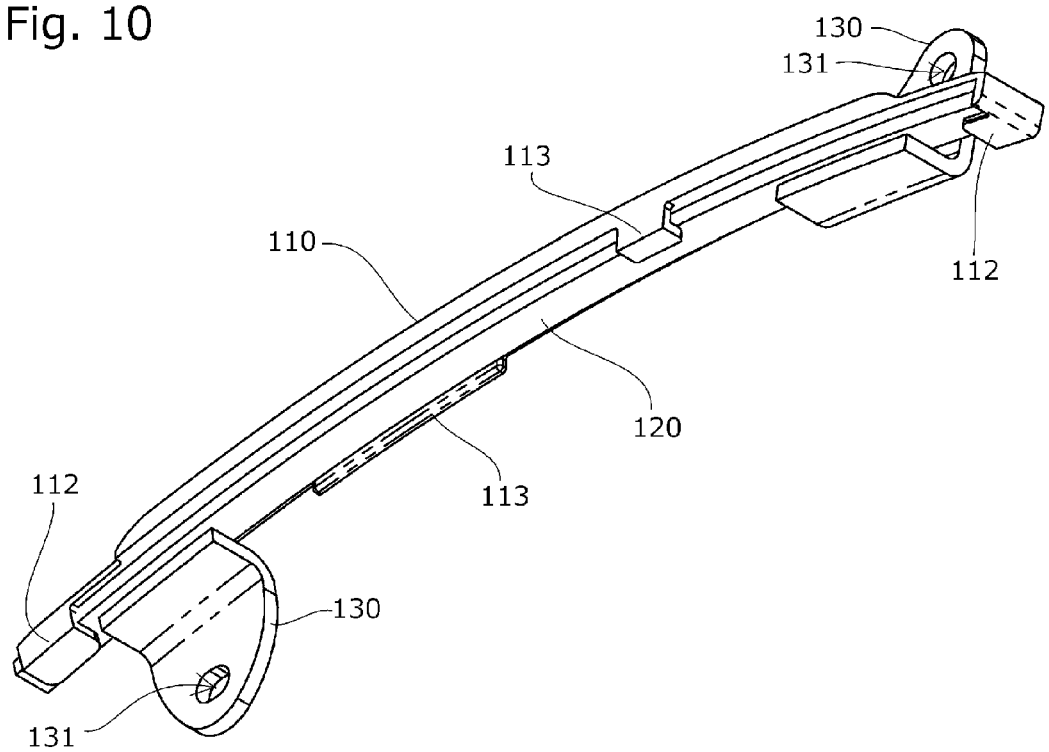
FIG. 10 is a perspective view of the chain guide according to another modification of the first embodiment of the present invention as viewed from below.
Figure 11:
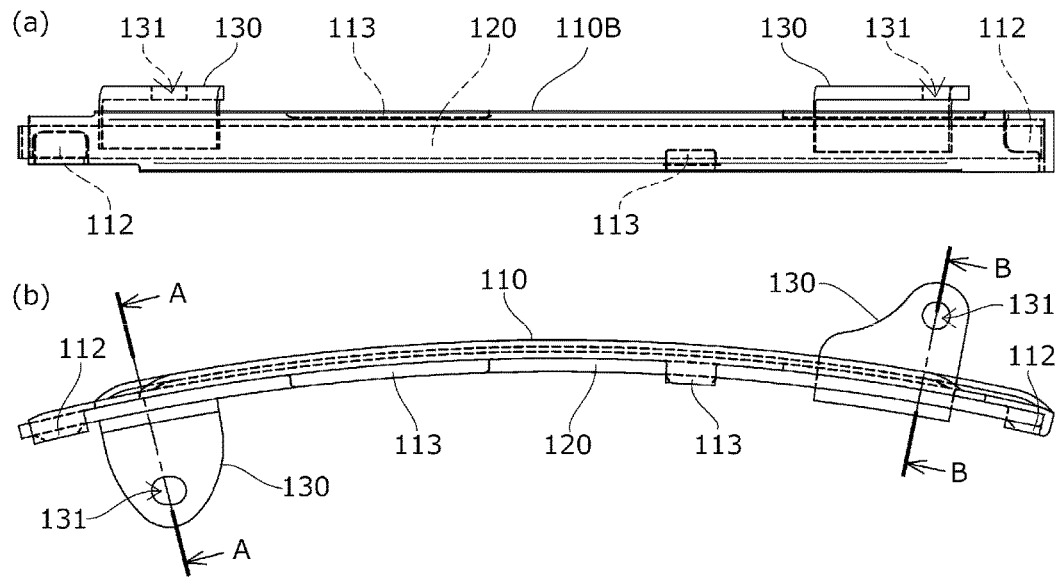
FIG. 11A is a plan view of the chain guide according to another modification of the first embodiment of the present invention.
FIG. 11B is a front view thereof.
Figure 12:
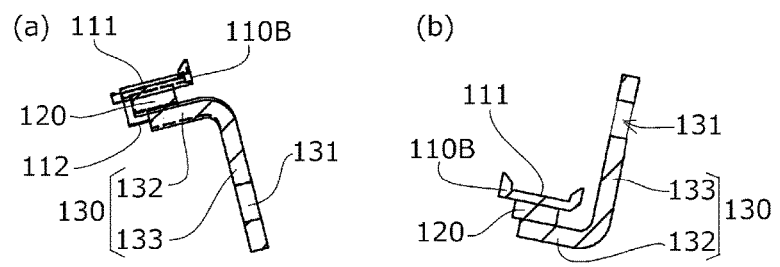
FIG. 12A is a cross-sectional view taken along the line A-A of FIG. 11B.
FIG. 12B is a cross-sectional view taken along the line B-B of FIG. 11B.
Figure 13:
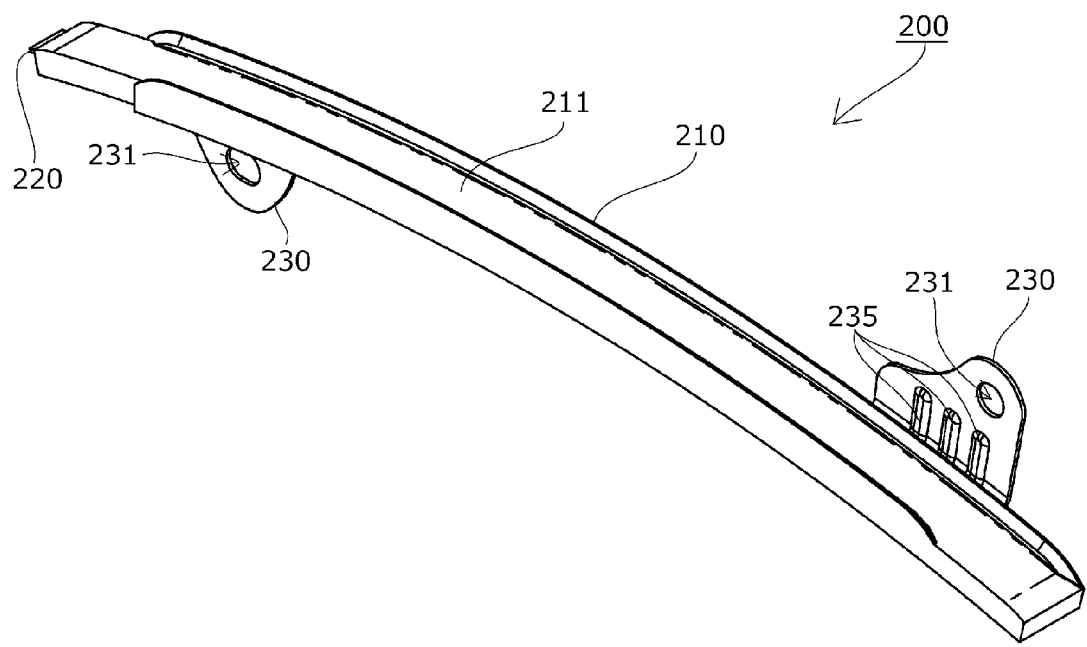
FIG. 13 is a perspective view of a chain guide according to a second embodiment of the present invention as viewed from above.
Figure 14:
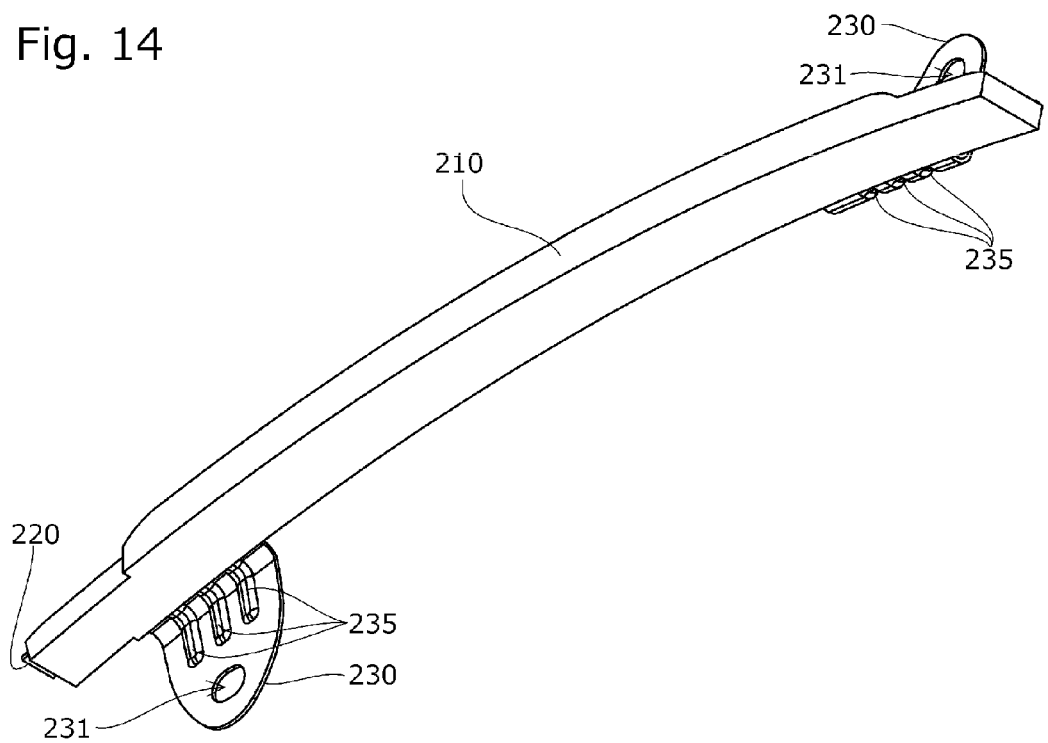
FIG. 14 is a perspective view of the chain guide according to the second embodiment of the present invention as viewed from below.
Figure 15:
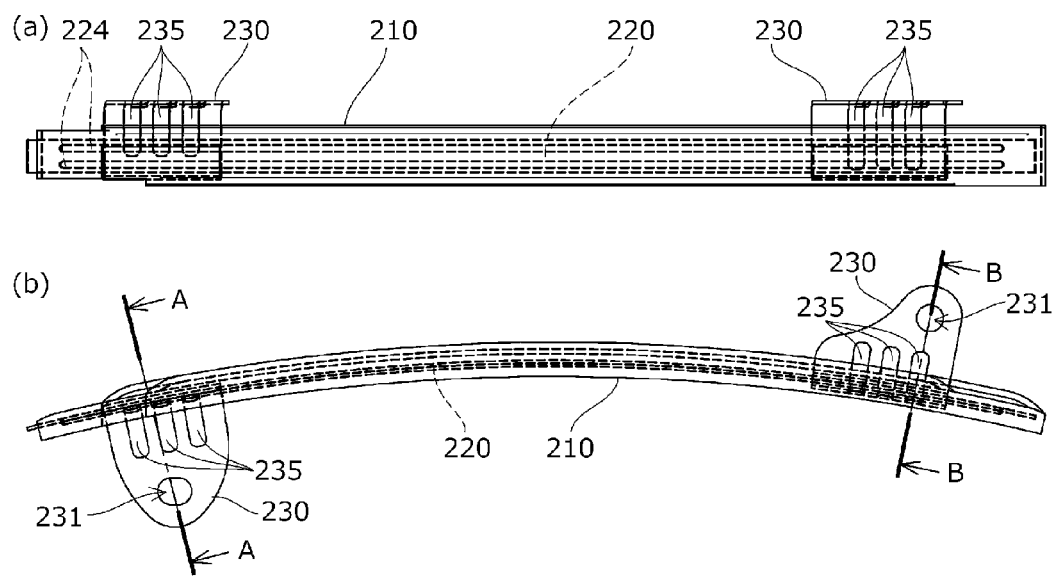
FIG. 15A is a plan view of the chain guide according to the second embodiment of the present invention.
FIG. 15B is a front view thereof.
Figure 16:
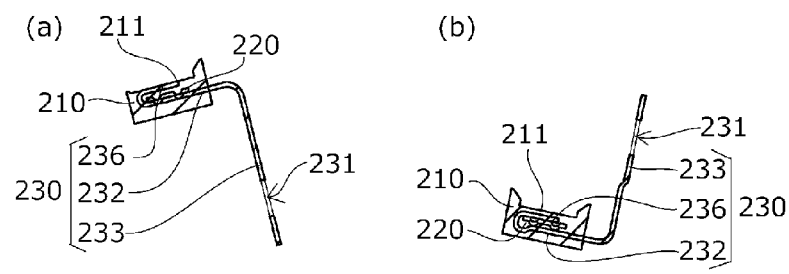
FIG. 16A is a cross-sectional view taken along the line A-A of FIG. 15B.
FIG. 16B is a cross-sectional view taken along the line B-B of FIG. 15B.
Figure 17:
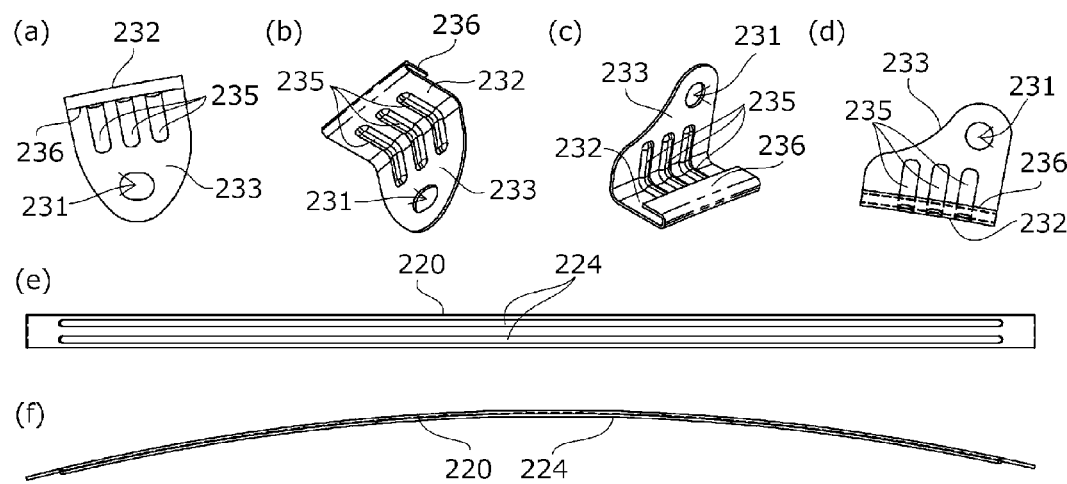
FIG. 17A is a front view of one attachment member of the chain guide according to the second embodiment of the present invention.
FIG. 17B is a perspective view of one attachment member thereof.
FIG. 17C is a perspective view of the other attachment member thereof.
FIG. 17D is a front view of the other attachment member thereof.
FIG. 17E is a plan view of a base member thereof.
FIG. 17F is a side view of the base member thereof.
Figure 18:
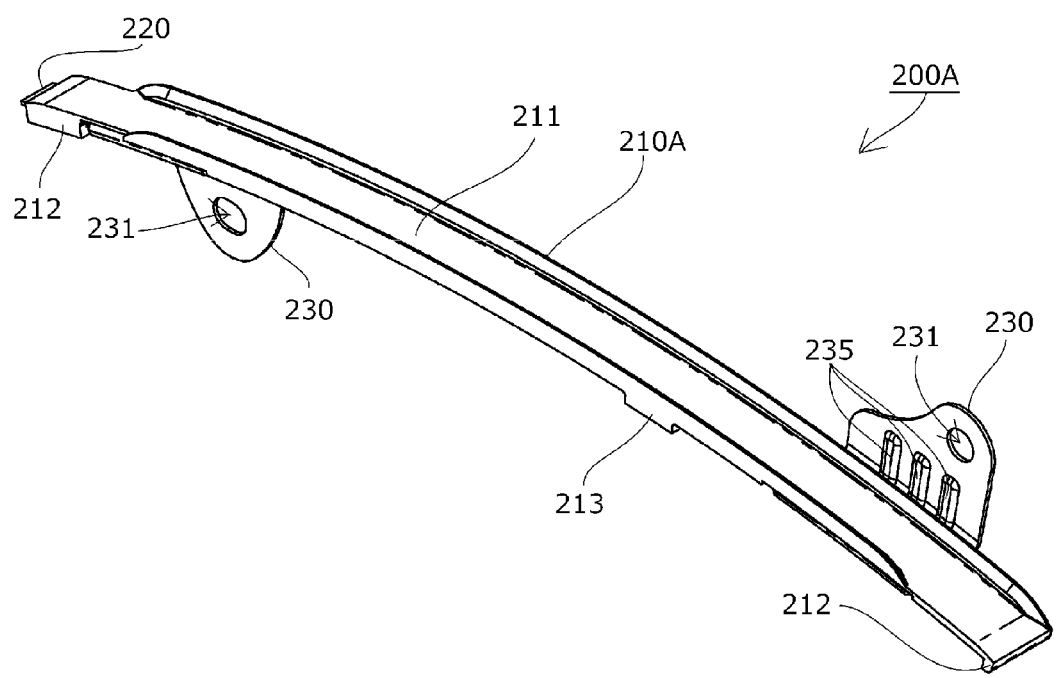
FIG. 18 is a perspective view of a chain guide according to a modification of the second embodiment of the present invention as viewed from above.
Figure 19:
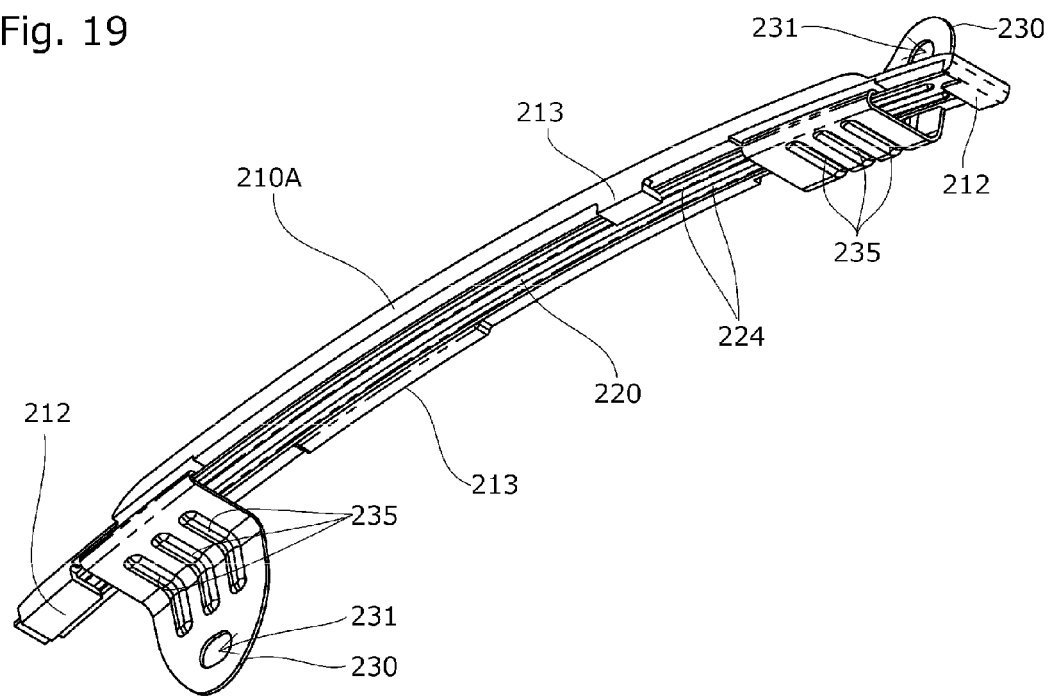
FIG. 19 is a perspective view of the chain guide according to the modification of the second embodiment of the present invention as viewed from below.
Figure 20:
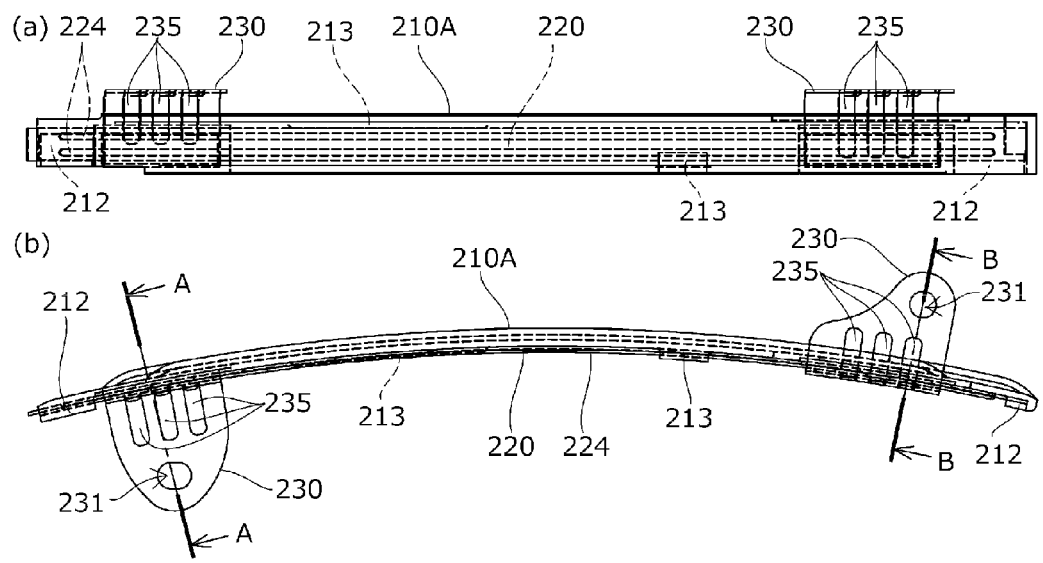
FIG. 20A is a plan view of the chain guide according to the modification of the second embodiment of the present invention.
FIG. 20B is a front view thereof.
Figure 21:
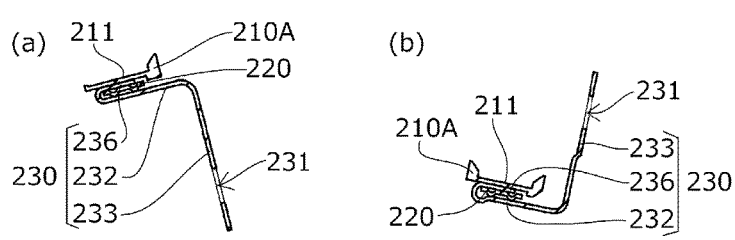
FIG. 21A is a cross-sectional view taken along the line A-A of FIG. 20B.
FIG. 21B is a cross-sectional view taken along the line B-B of FIG. 20B.
Figure 22:
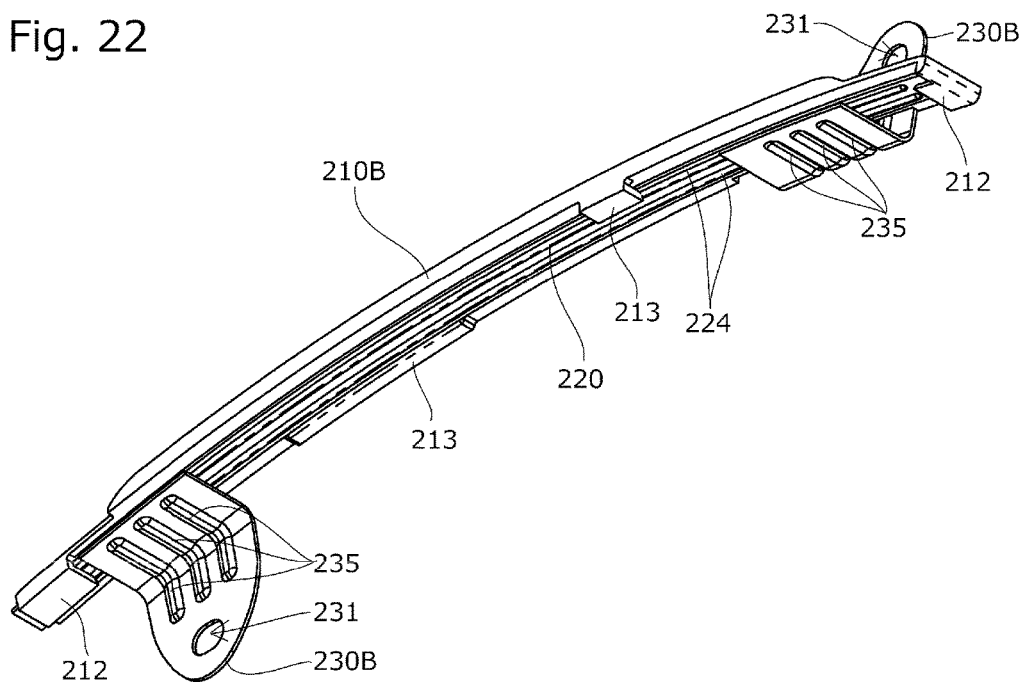
FIG. 22 is a perspective view of a chain guide according to another modification of the second embodiment of the present invention as viewed from below.
Figure 23:
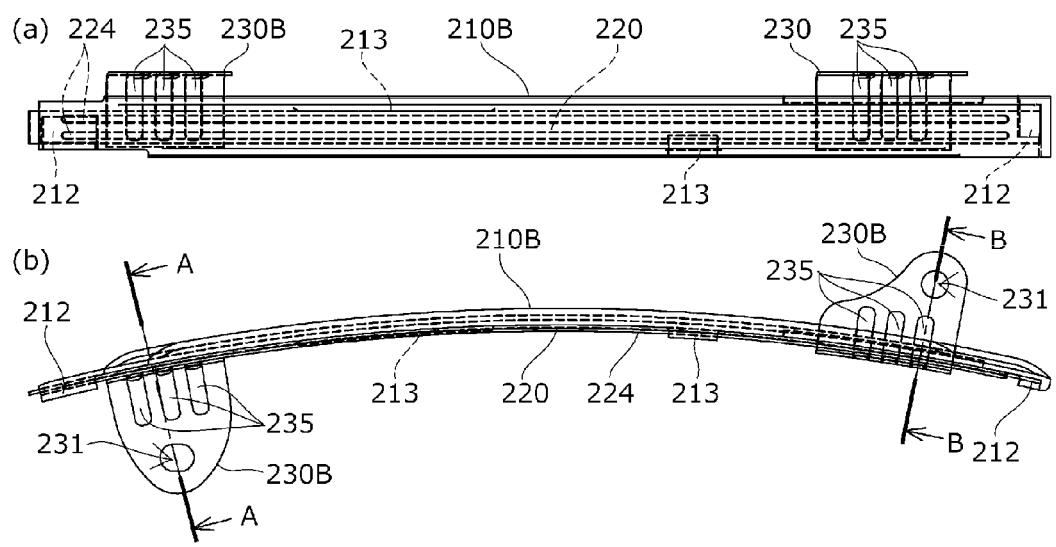
FIG. 23A is a plan view of the chain guide according to another modification of the second embodiment of the present invention.
FIG. 23B is a front view thereof.
Figure 24:
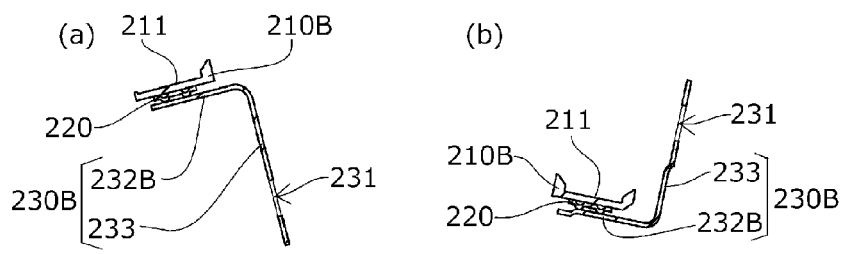
FIG. 24A is a cross-sectional view taken along the line A-A of FIG. 23B.
FIG. 24B is a cross-sectional view taken along the line B-B of FIG. 23B.
Figure 25:
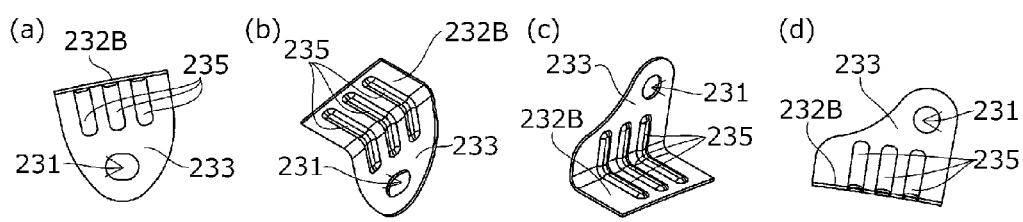
FIG. 25A is a front view of one attachment member of the chain guide according to another modification of the second embodiment of the present invention.
FIG. 25B is a perspective view of one attachment member thereof.
FIG. 25C is a perspective view of the other attachment member thereof.
FIG. 25D is a front view of the other attachment member thereof.
Figure 26:
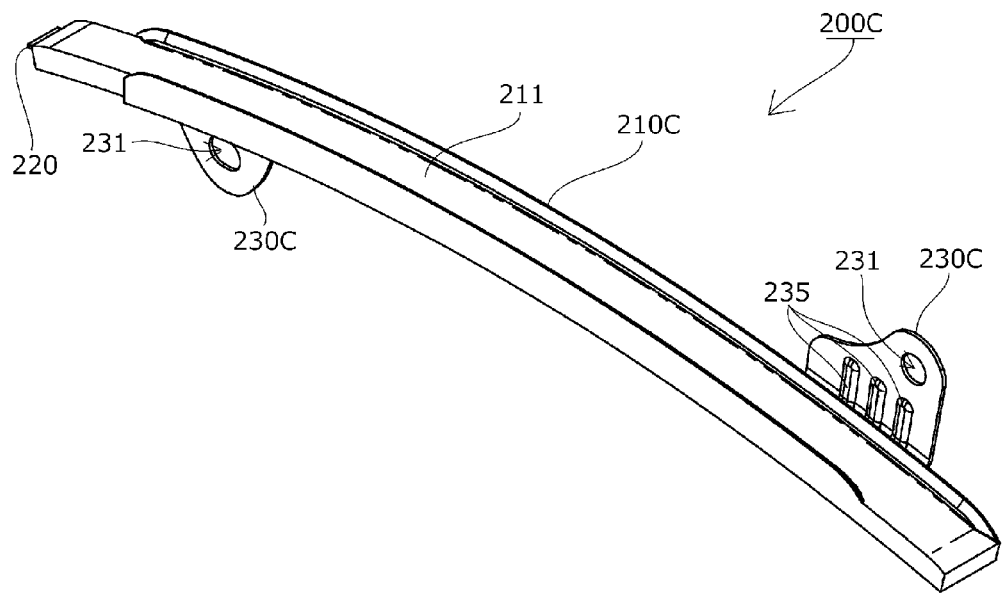
FIG. 26 is a perspective view of a chain guide according to a third modification of the second embodiment of the present invention as viewed from above.
Figure 27:
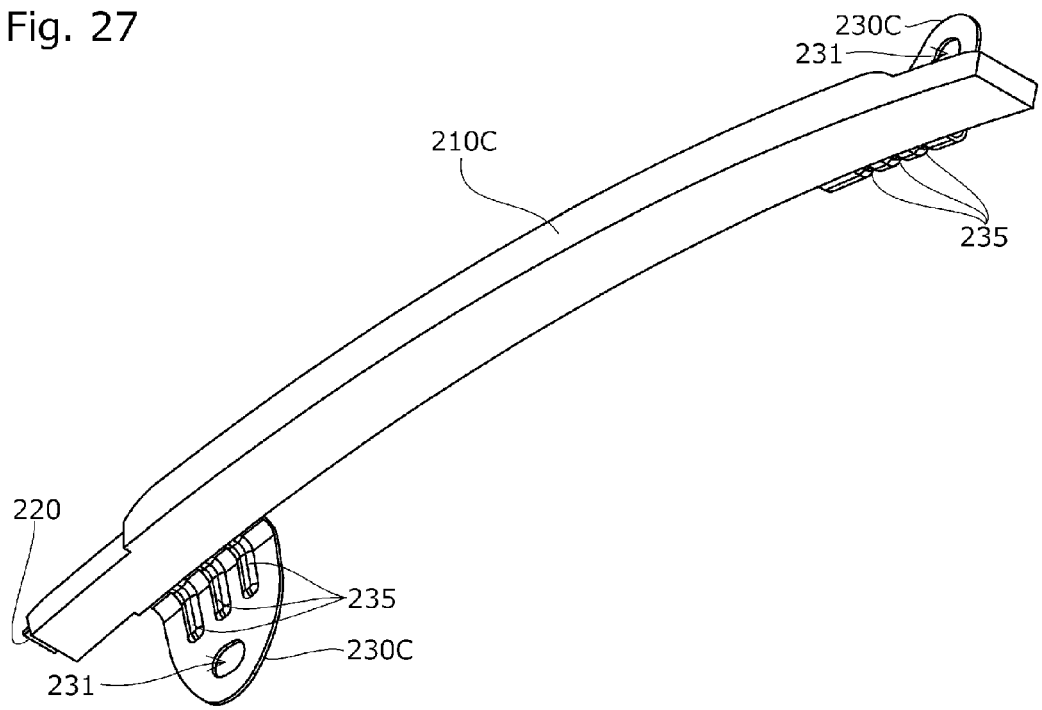
FIG. 27 is a perspective view of the chain guide according to the third modification of the second embodiment of the present invention as viewed from below.
Figure 28:
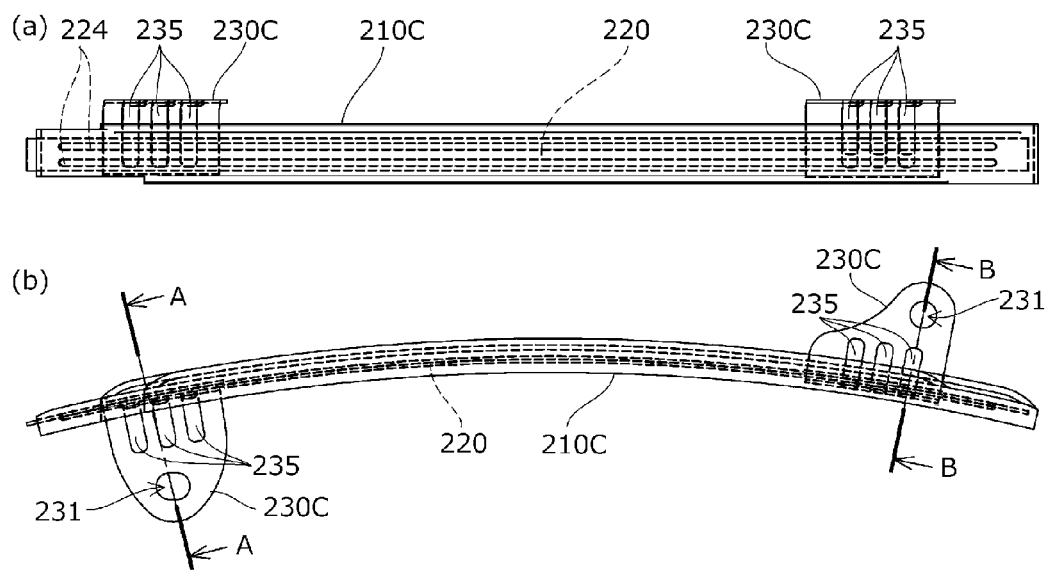
FIG. 28A is a plan view of the chain guide according to the third modification of the second embodiment of the present invention.
FIG. 28B is a front view thereof.
Figure 29:
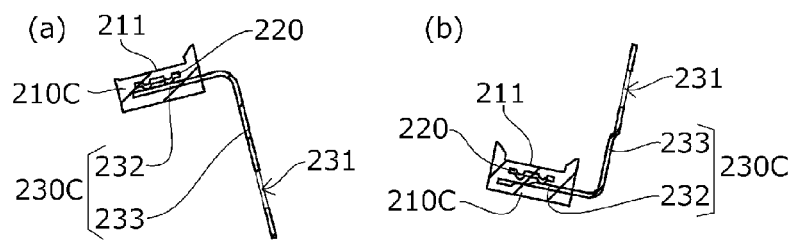
FIG. 29A is a cross-sectional view taken along the line A-A of FIG. 28B.
FIG. 29B is a cross-sectional view taken along the line B-B of FIG. 28B.
Figure 30:
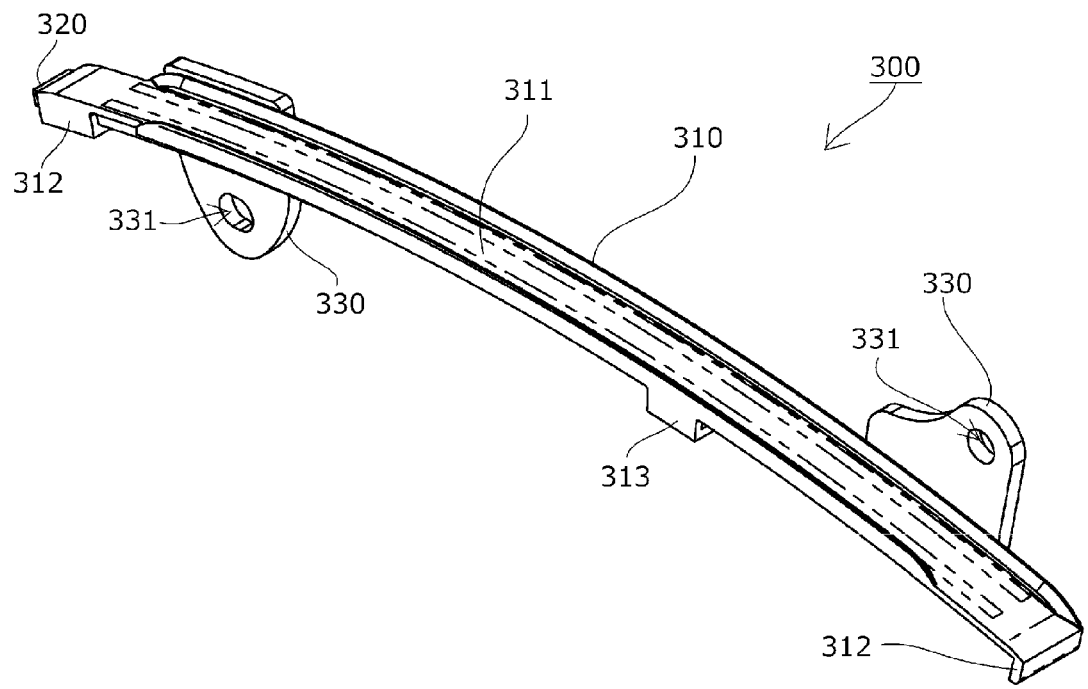
FIG. 30 is a perspective view of a chain guide according to a third embodiment of the present invention as viewed from above.
Figure 31:
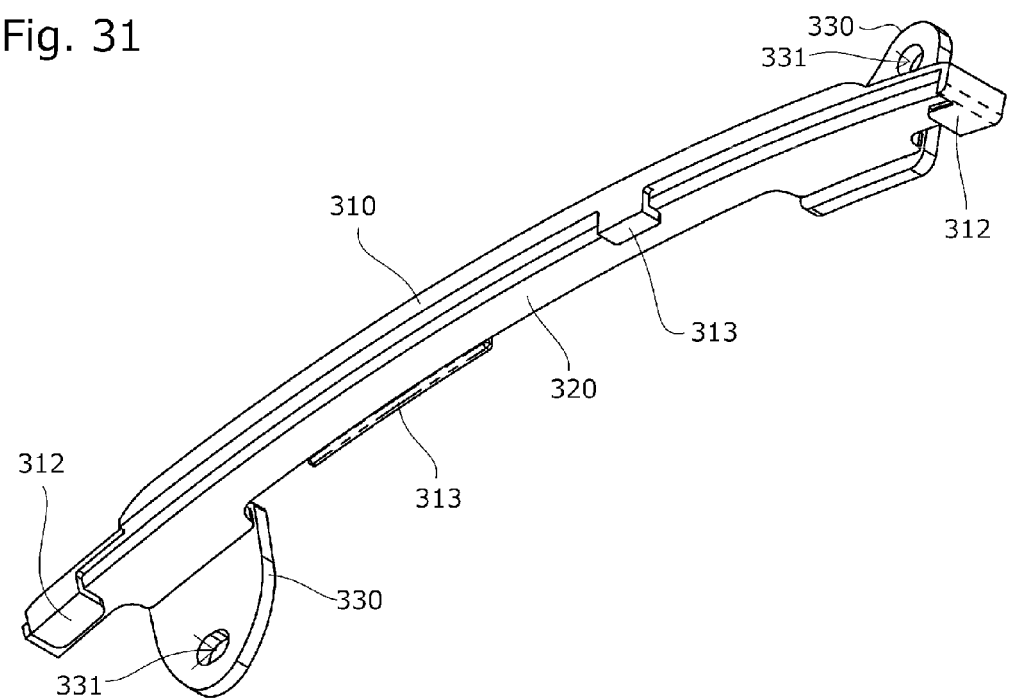
FIG. 31 is a perspective view of the chain guide according to the third embodiment of the present invention as viewed from below.
Figure 32:
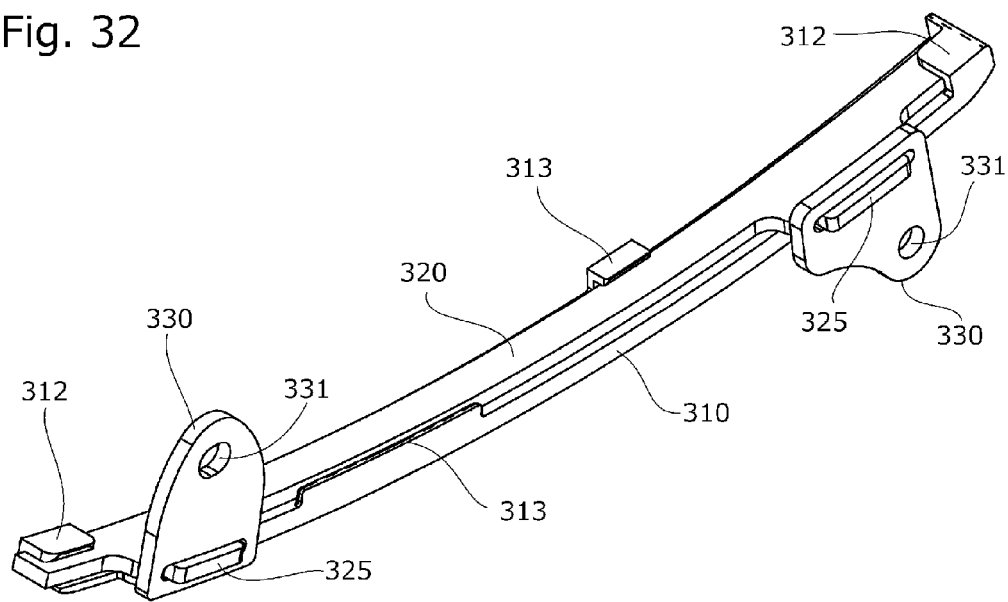
FIG. 32 is a perspective view thereof as viewed from below in a direction different from that in FIG. 31.
Figure 33:
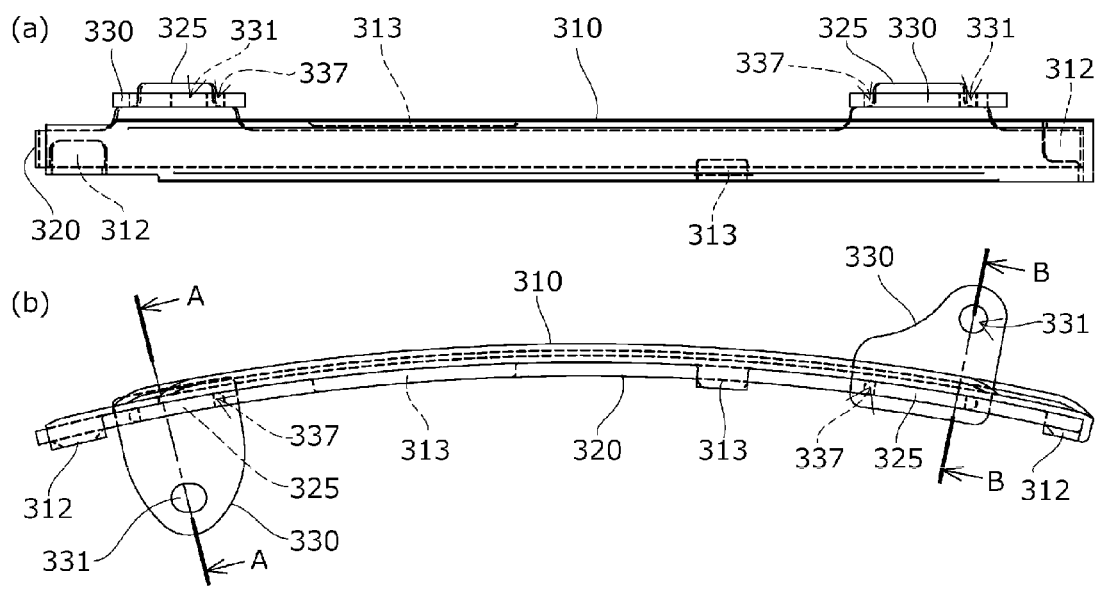
FIG. 33A is a plan view of the chain guide according to the third embodiment of the present invention.
FIG. 33B is a front view thereof.
Figure 34:
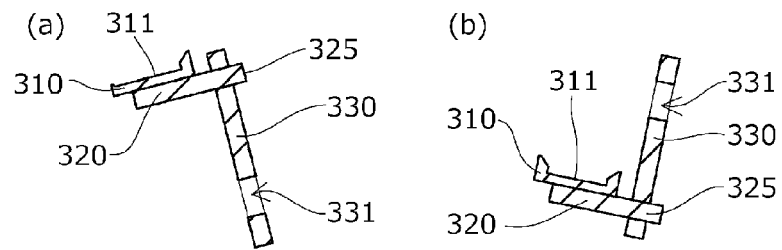
FIG. 34A is a cross-sectional view taken along the line A-A of FIG. 33B.
FIG. 34B is a cross-sectional view taken along the line B-B of FIG. 33B.
Figure 35:
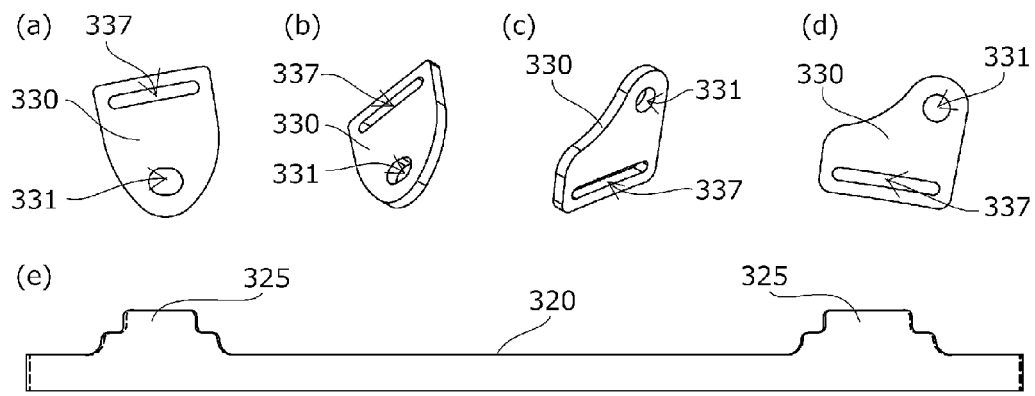
FIG. 35A is a front view of one attachment member of the chain guide according to the third embodiment of the present invention.
FIG. 35B is a perspective view of one attachment member thereof.
FIG. 35C is a perspective view of the other attachment member thereof.
FIG. 35D is a front view of the other attachment member thereof.
FIG. 35E is a plan view of a base member thereof.
Figure 36:
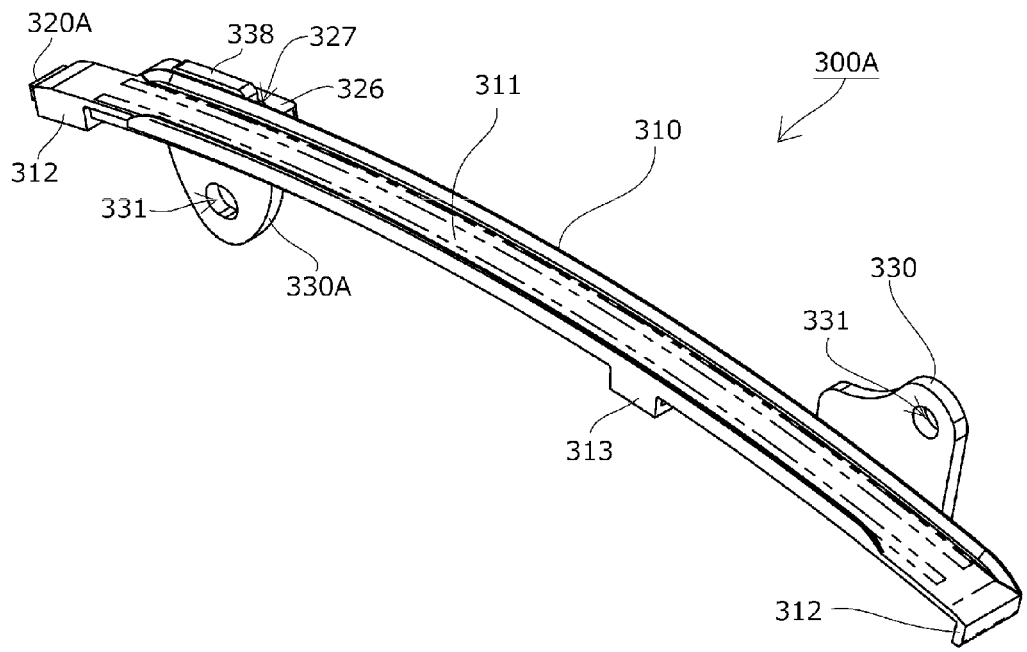
FIG. 36 is a perspective view of a chain guide according to a modification of the third embodiment of the present invention as viewed from above.
Figure 37:
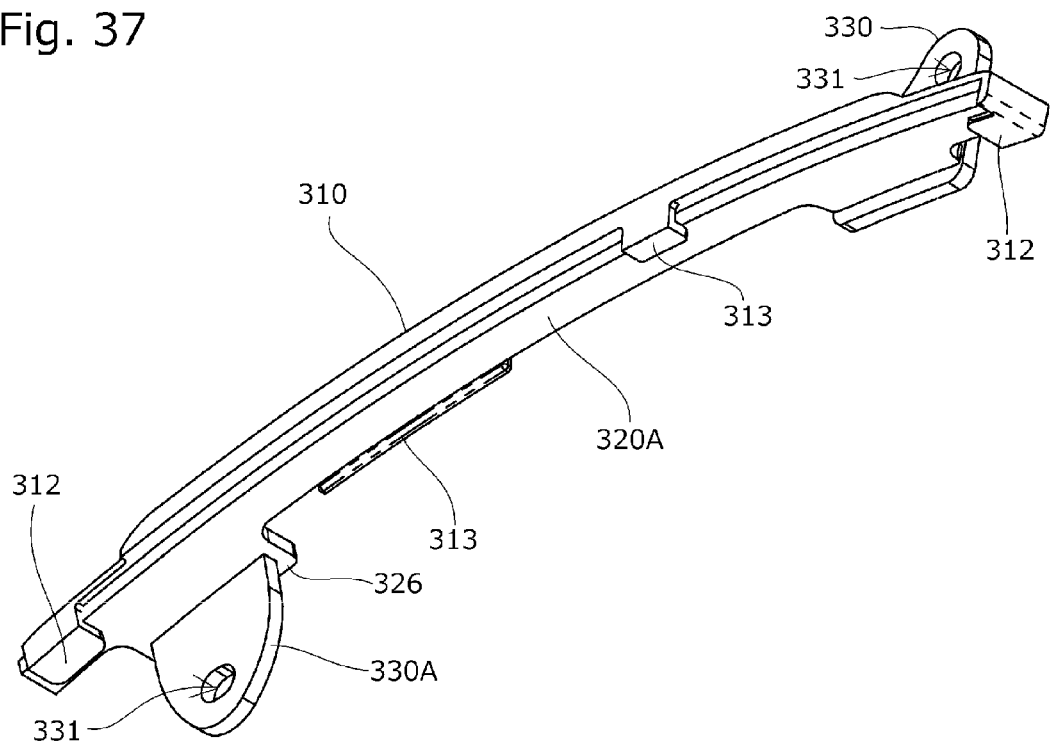
FIG. 37 is a perspective view of the chain guide according to the modification of the third embodiment of the present invention as viewed from below.
Figure 38:
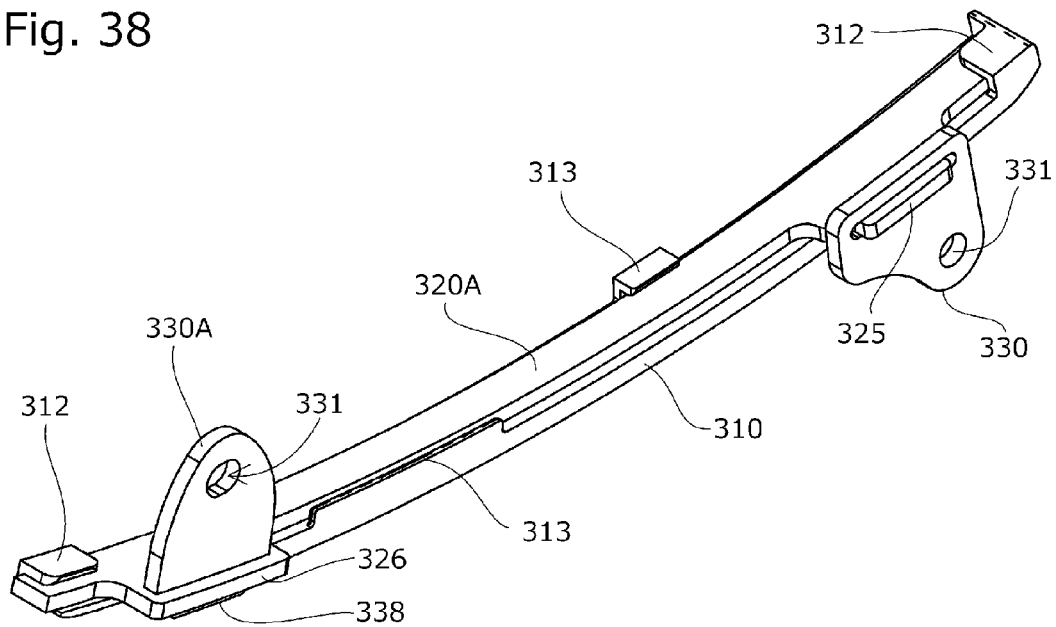
FIG. 38 is a perspective view thereof as viewed from below in a direction different from that in FIG. 37.
Figure 39:
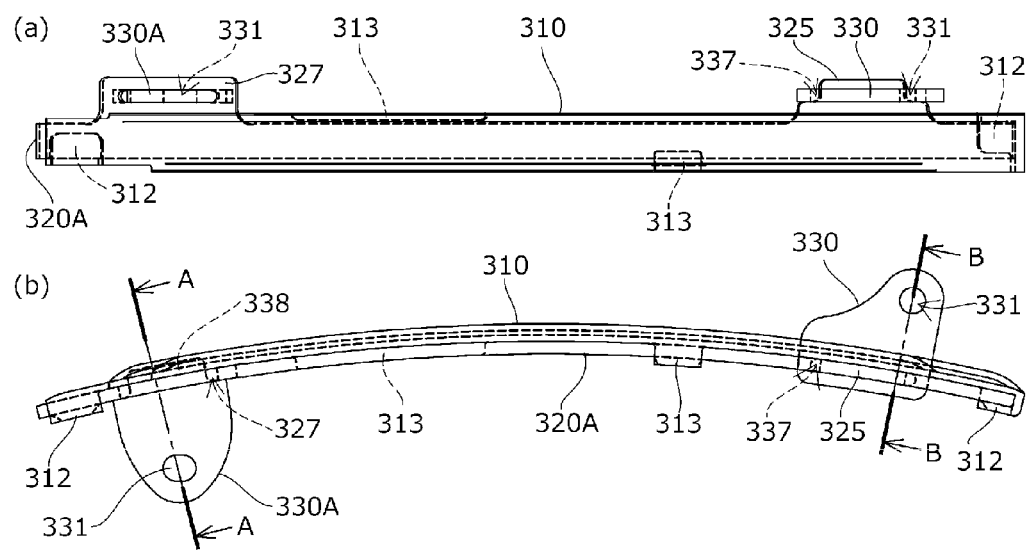
FIG. 39A is a plan view of the chain guide according to the modification of the third embodiment of the present invention.
FIG. 39B is a front view thereof.
Figure 40:
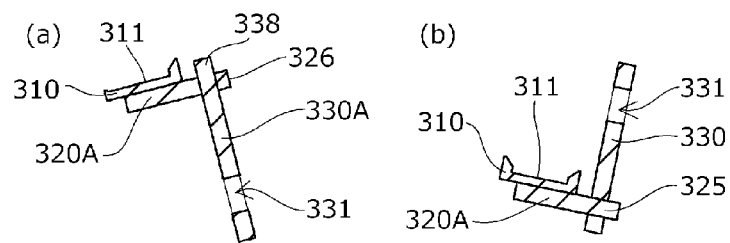
FIG. 40A is a cross-sectional view taken along the line A-A of FIG. 39B.
FIG. 40B is a cross-sectional view taken along the line B-B of FIG. 39B.
Figure 41:
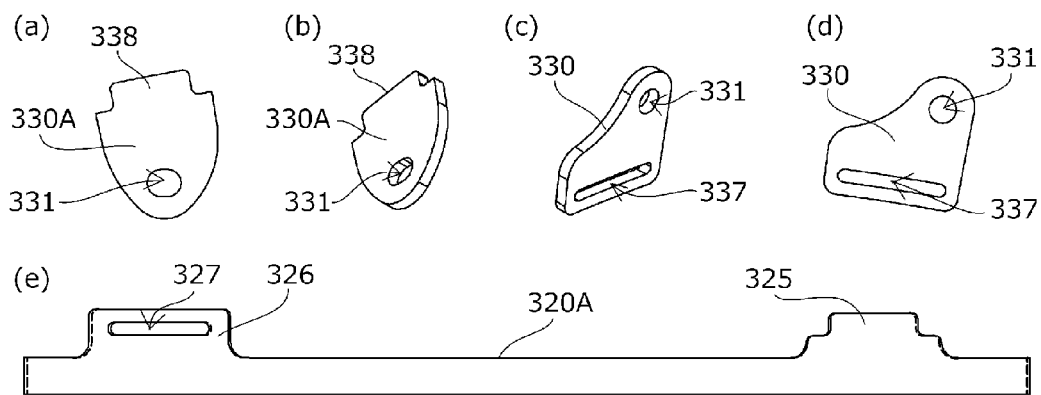
FIG. 41A is a front view of one attachment member of the chain guide according to the modification of the third embodiment of the present invention.
FIG. 41B is a perspective view of one attachment member thereof.
FIG. 41C is a perspective view of the other attachment member thereof.
FIG. 41D is a front view of the other attachment member thereof.
FIG. 41E is a plan view of a base member thereof.
Figure 42:
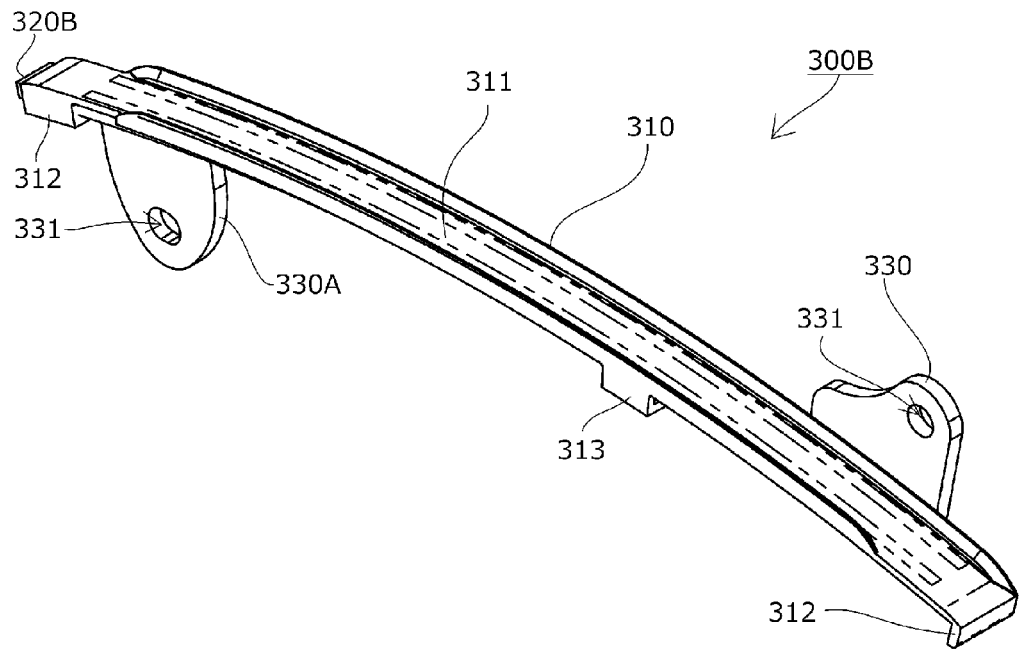
FIG. 42 is a perspective view of a chain guide according to another modification of the third embodiment of the present invention as viewed from above.
Figure 43:
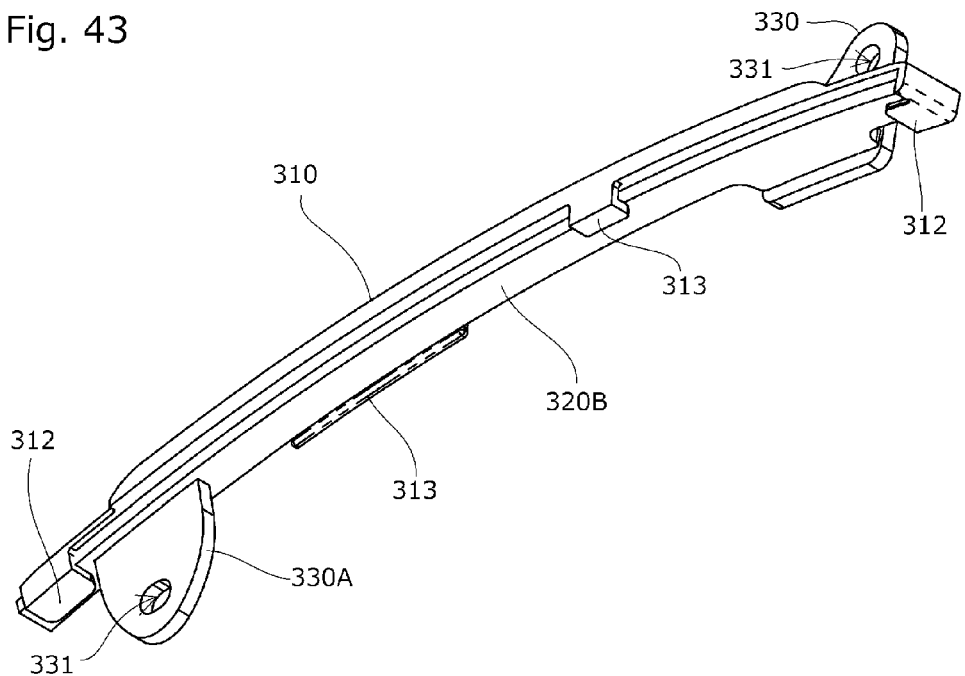
FIG. 43 is a perspective view of the chain guide according to another modification of the third embodiment of the present invention as viewed from below.
Figure 44:
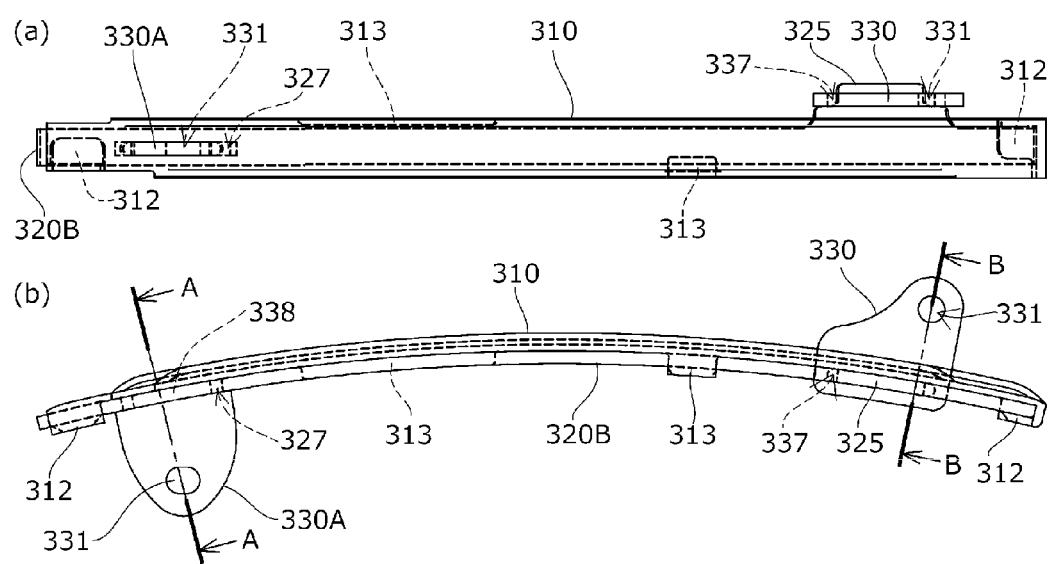
FIG. 44A is a plan view of the chain guide according to another modification of the third embodiment of the present invention.
FIG. 44B is a front view thereof.
Figure 45:
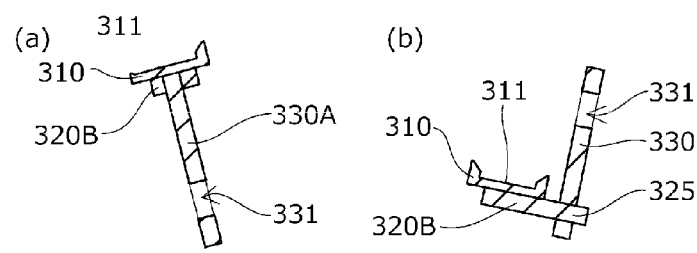
FIG. 45A is a cross-sectional view taken along the line A-A of FIG. 44B.
FIG. 45B is a cross-sectional view taken along the line B-B of FIG. 44B.
Figure 46:
FIG. 46 is a plan view of a base member of the chain guide according to another modification of the third embodiment of the present invention.
Figure 47:
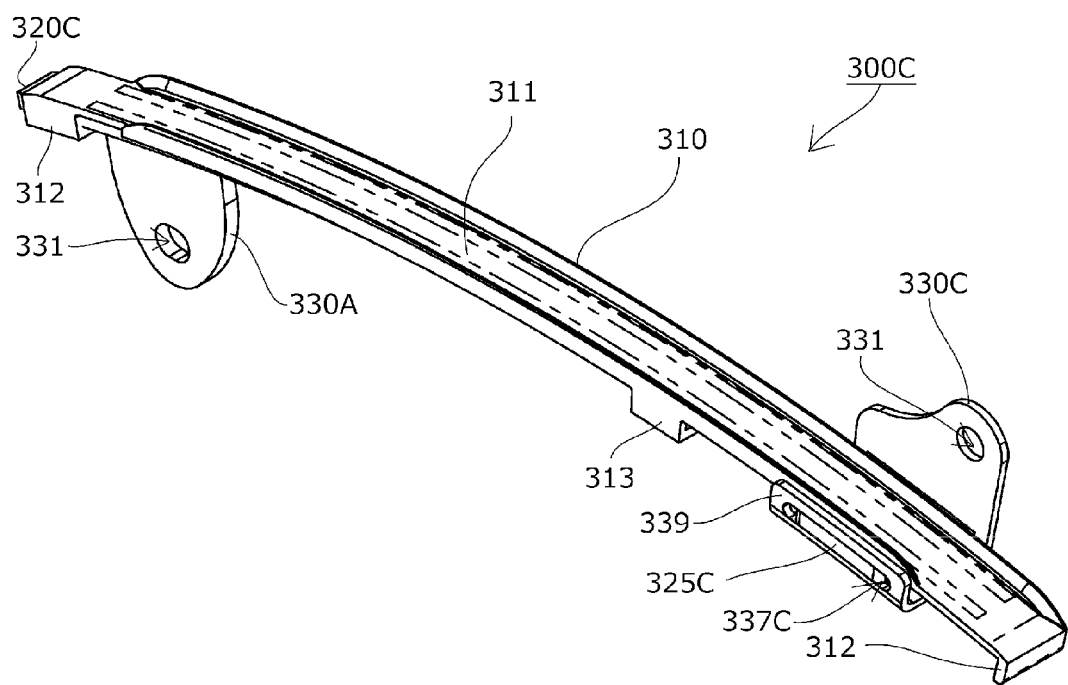
FIG. 47 is a perspective view of a chain guide according to a third modification of the third embodiment of the present invention as viewed from above.
Figure 48:
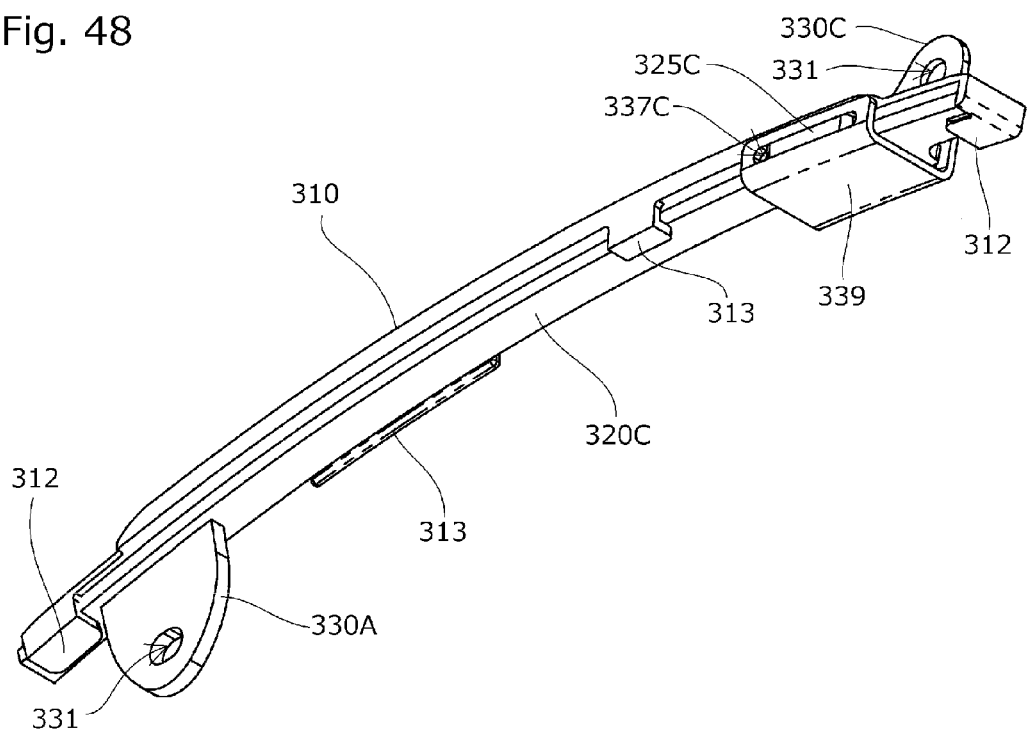
FIG. 48 is a perspective view of the chain guide according to the third modification of the third embodiment of the present invention as viewed from below.
Figure 49:
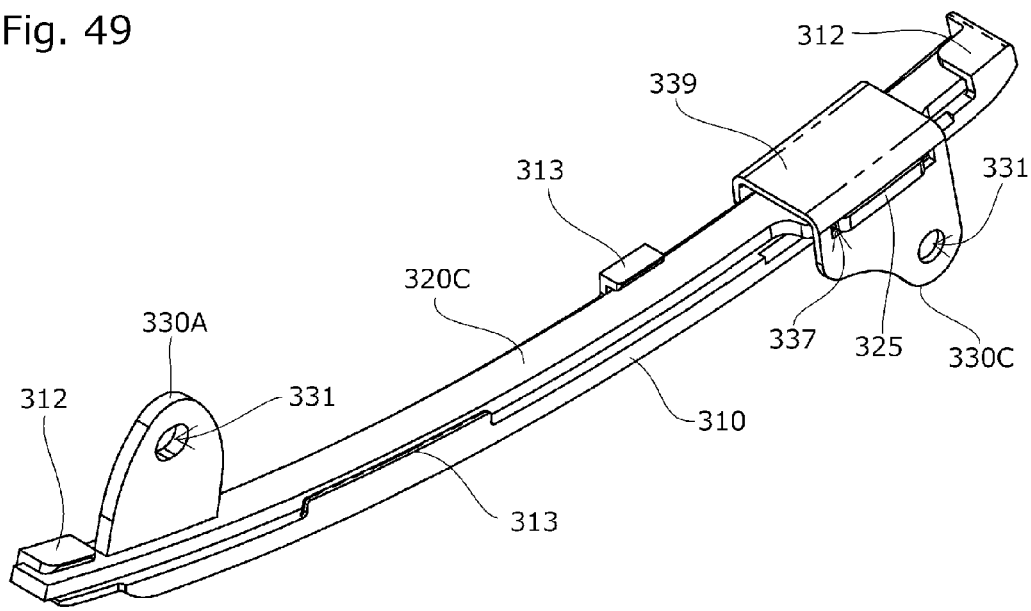
FIG. 49 is a perspective view thereof as viewed from below in a direction different from that in FIG. 48.
Figure 50:
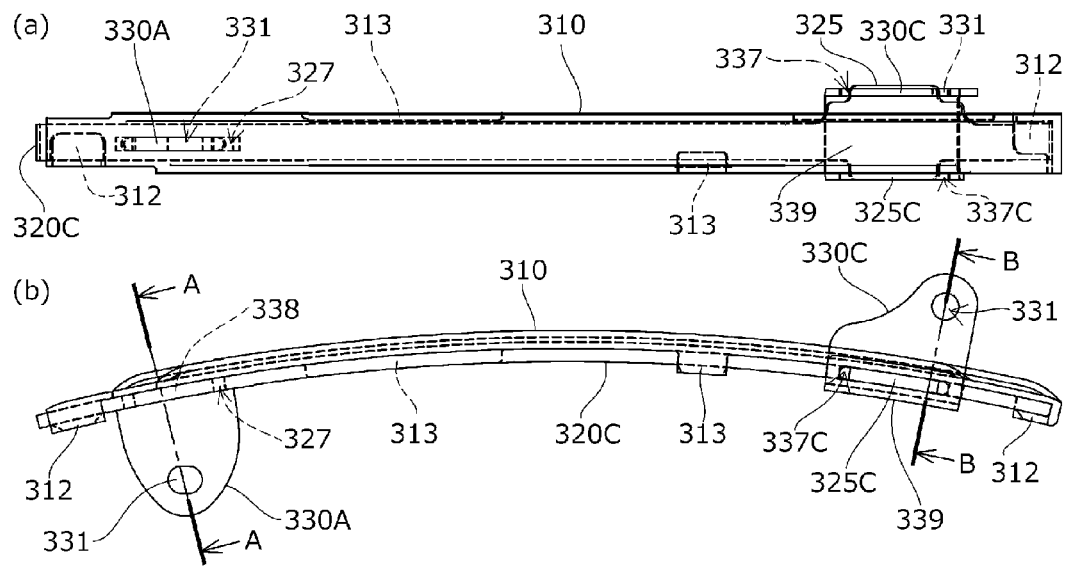
FIG. 50A is a plan view of the chain guide according to the third modification of the third embodiment of the present invention.
FIG. 50B is a front view thereof.
Figure 51:
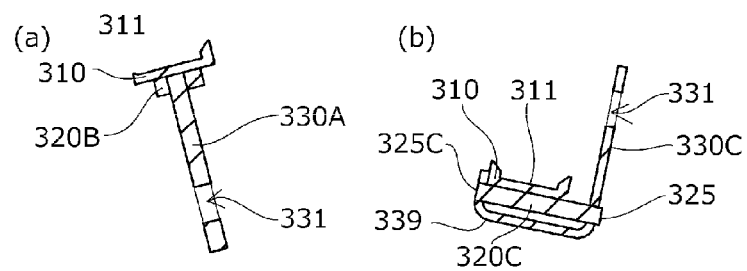
FIG. 51A is a cross-sectional view taken along the line A-A of FIG. 50B.
FIG. 51B is a cross-sectional view taken along the line B-B of FIG. 50B.
Figure 52:
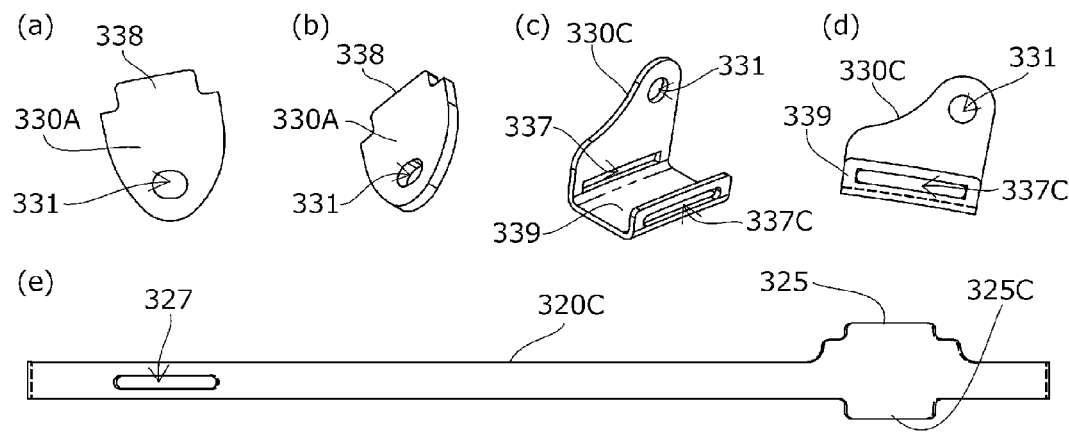
FIG. 52A is a front view of one attachment member of the chain guide according to the third modification of the third embodiment of the present invention.
FIG. 52B is a perspective view of one attachment member thereof.
FIG. 52C is a perspective view of the other attachment member thereof.
FIG. 52D is a front view of the other attachment member thereof.
FIG. 52E is a plan view of a base member thereof.
Figure 53:
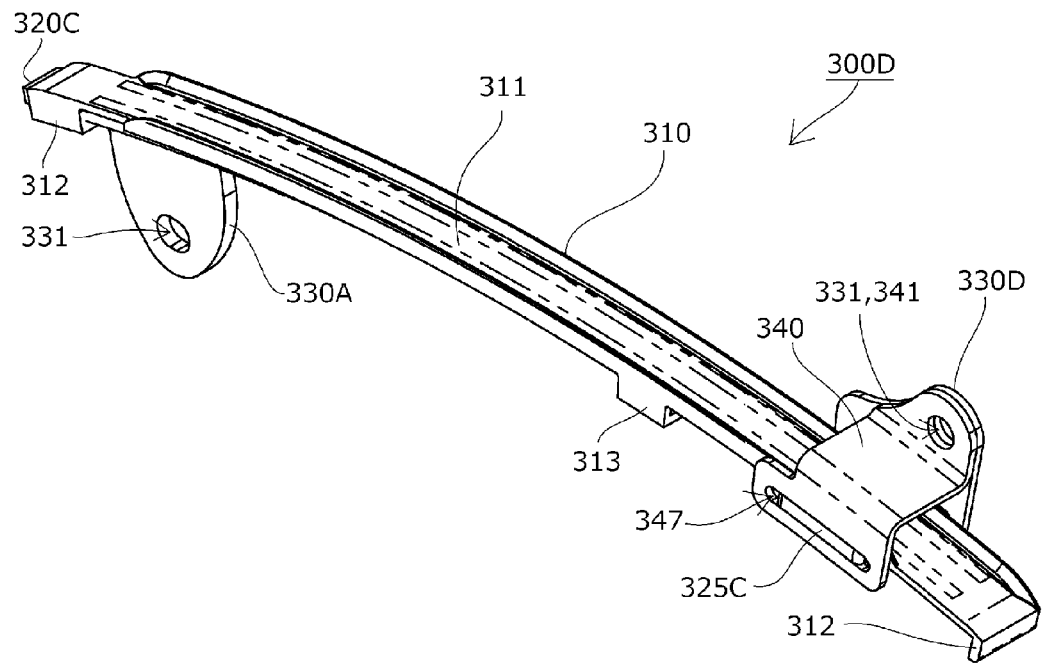
FIG. 53 is a perspective view of a chain guide according to a fourth modification of the third embodiment of the present invention as viewed from above.
Figure 54:
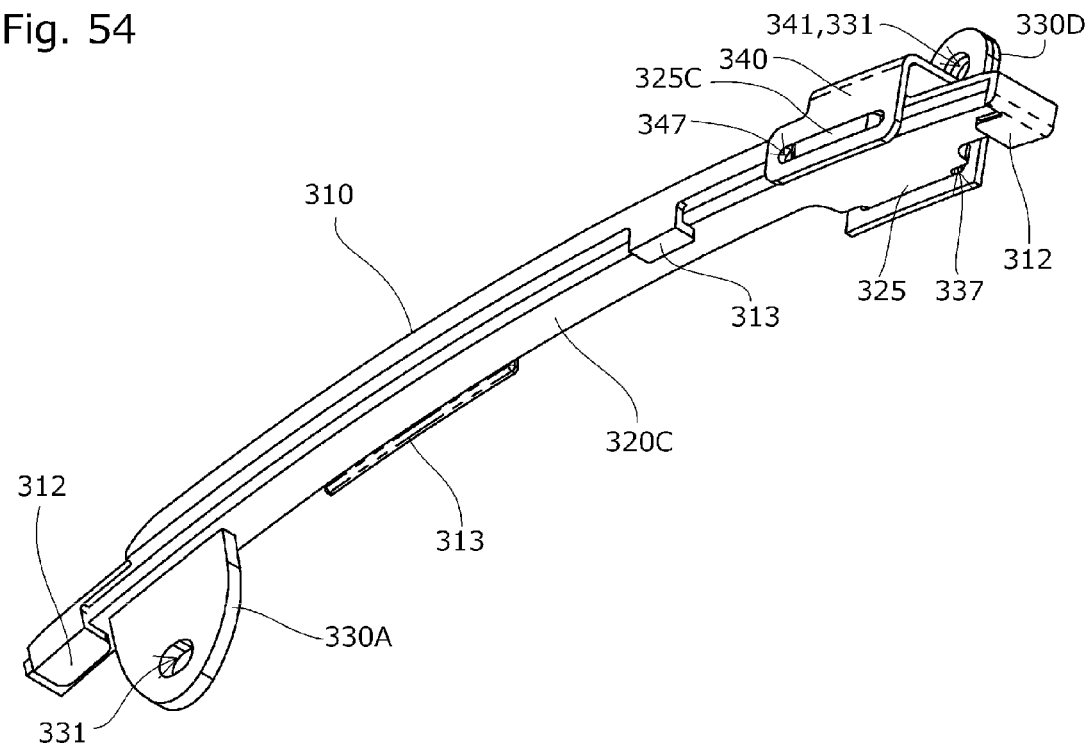
FIG. 54 is a perspective view of the chain guide according to the fourth modification of the third embodiment of the present invention as viewed from below.
Figure 55:
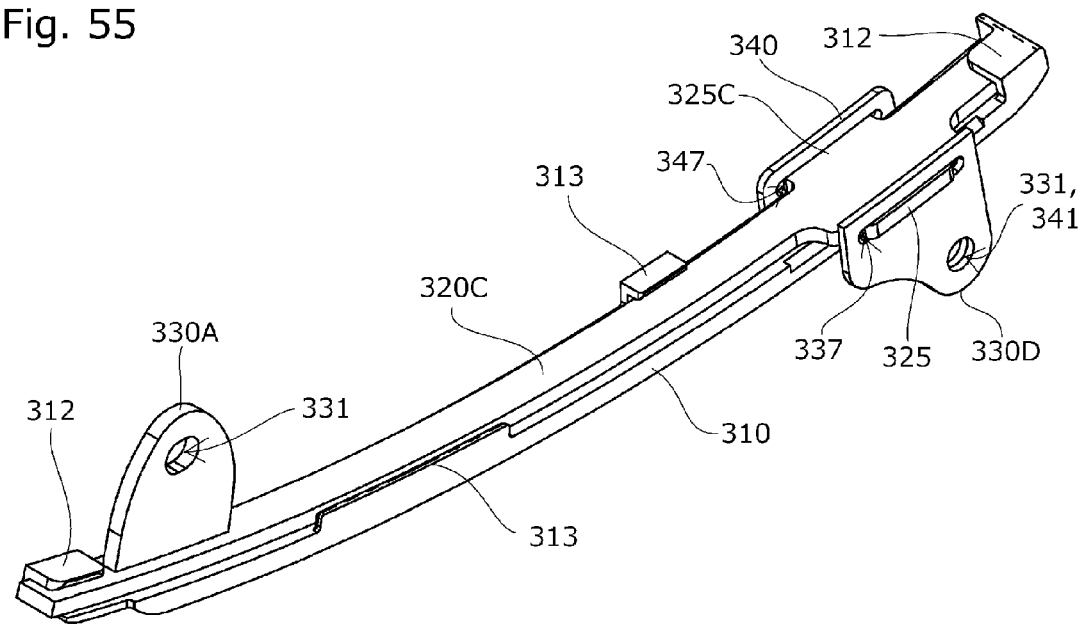
FIG. 55 is a perspective view thereof as viewed from below in a direction different from that in FIG. 54.
Figure 56:
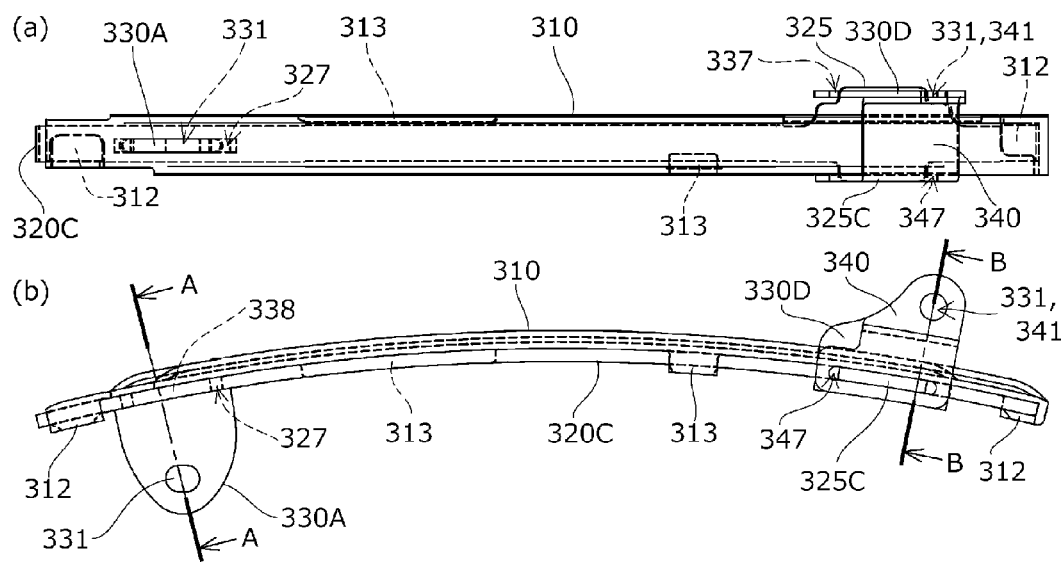
FIG. 56A is a plan view of the chain guide according to the fourth modification of the third embodiment of the present invention.
FIG. 56B is a front view thereof.
Figure 57:
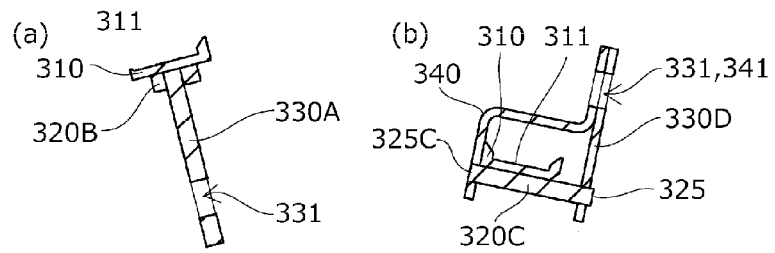
FIG. 57A is a cross-sectional view taken along the line A-A of FIG. 56B.
FIG. 57B is a cross-sectional view taken along the line B-B of FIG. 56B.
Figure 58:
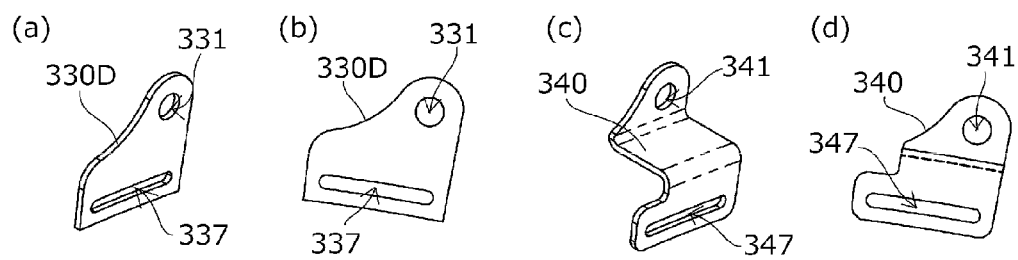
FIG. 58A is a perspective view of the other attachment member of the chain guide according to the fourth modification of the third embodiment of the present invention.
FIG. 58B is a front view of the other attachment member thereof.
FIG. 58C is a perspective view of the other second attachment member thereof.
FIG. 58D is a front view of the other second attachment member thereof.
Figure 59:
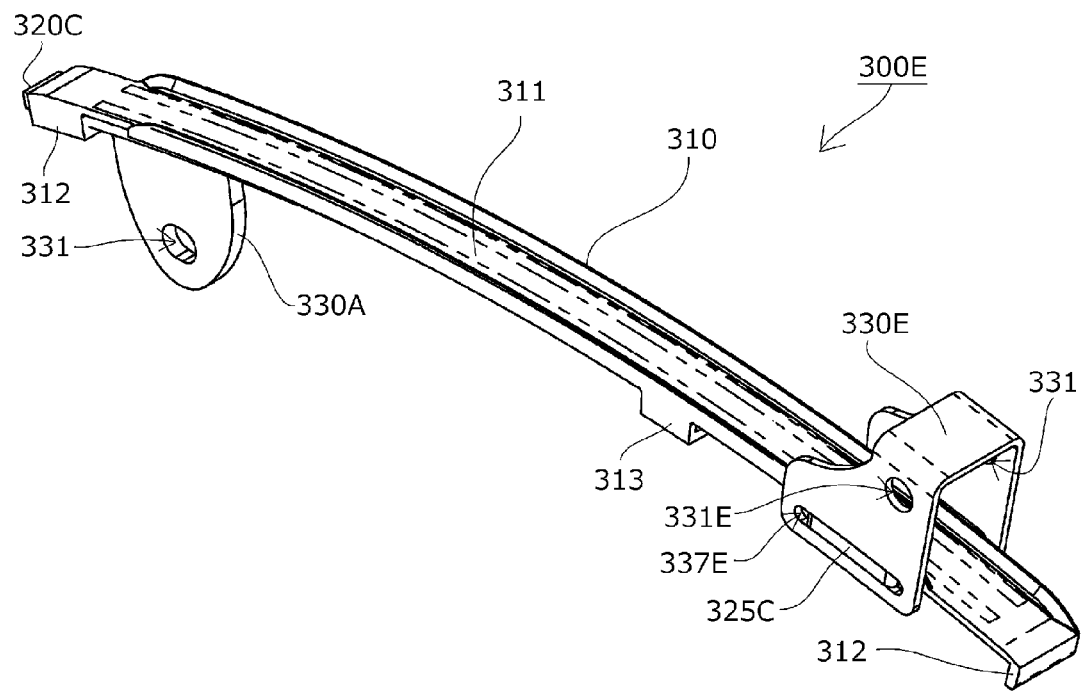
FIG. 59 is a perspective view of a chain guide according to a fifth modification of the third embodiment of the present invention as viewed from above.
Figure 60:
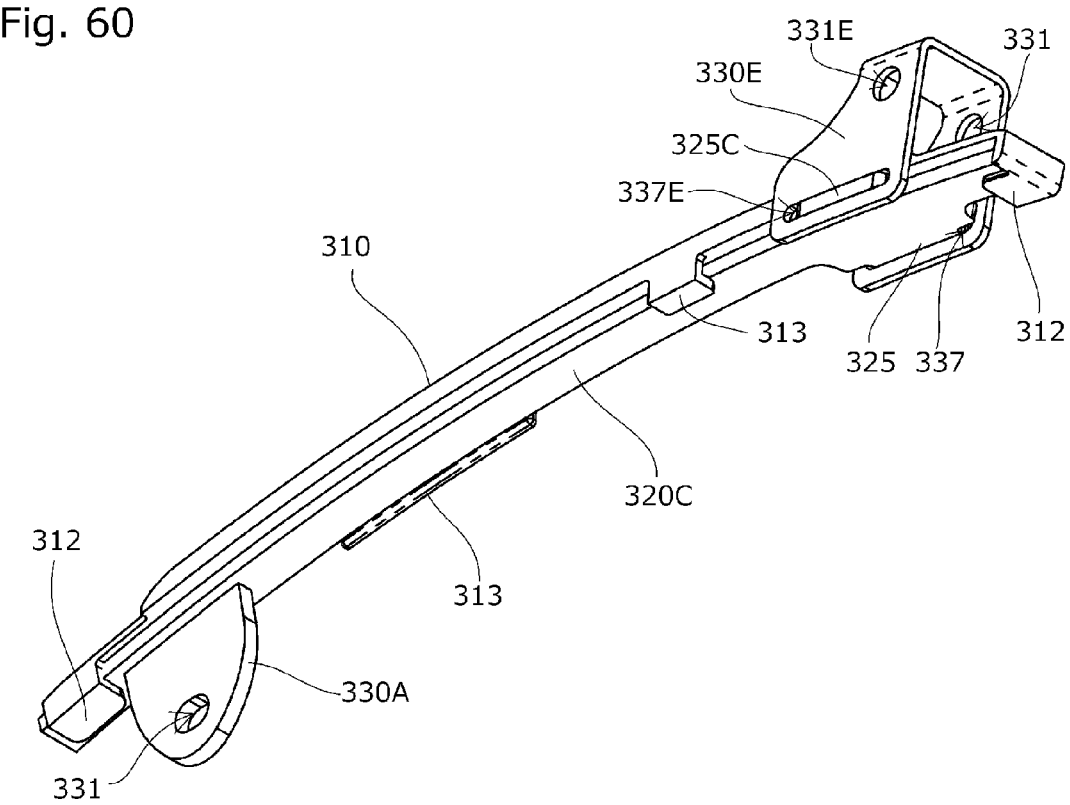
FIG. 60 is a perspective view of the chain guide according to the fifth modification of the third embodiment of the present invention as viewed from below.
Figure 61:
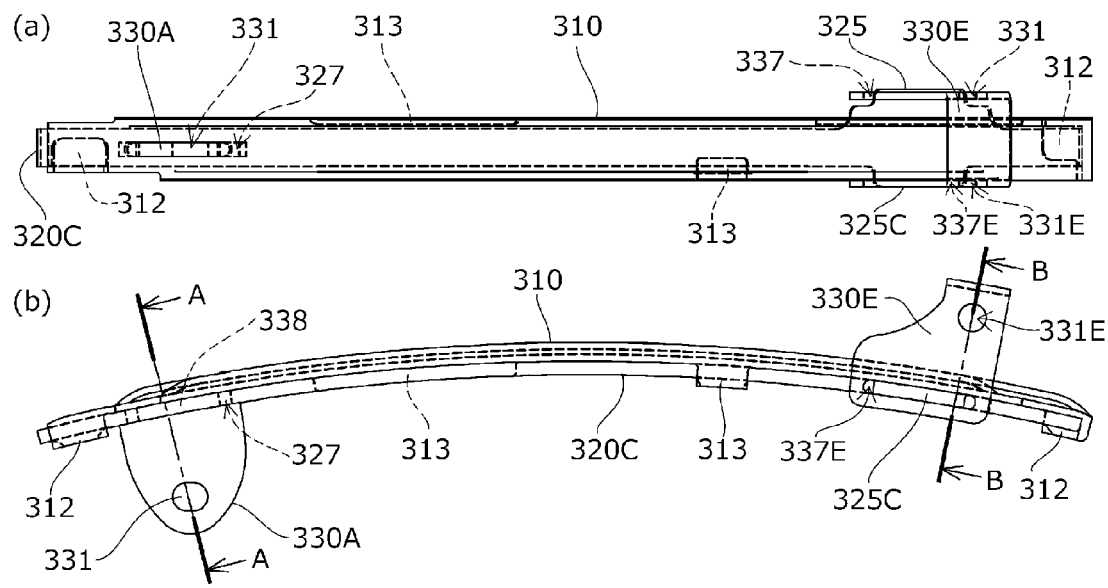
FIG. 61A is a plan view of the chain guide according to the fifth modification of the third embodiment of the present invention.
FIG. 61B is a front view thereof.
Figure 62:
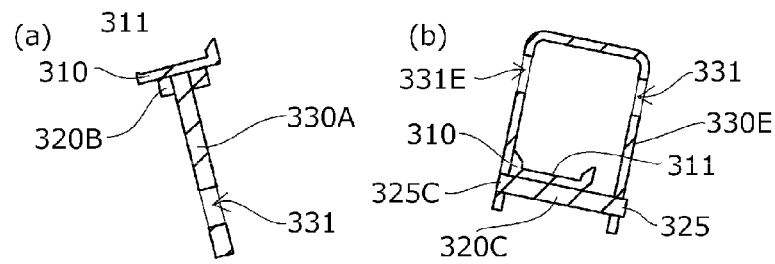
FIG. 62A is a cross-sectional view taken along the line A-A of FIG. 61B.
FIG. 62B is a cross-sectional view taken along the line B-B of FIG. 61B.
Figure 63:
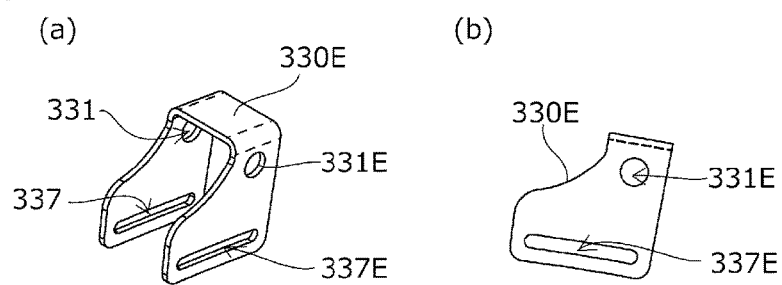
FIG. 63A is a perspective view of the other attachment member of the chain guide according to the fifth modification of the third embodiment of the present invention.
FIG. 63B is a front view of the other attachment member thereof.
Figure 64:
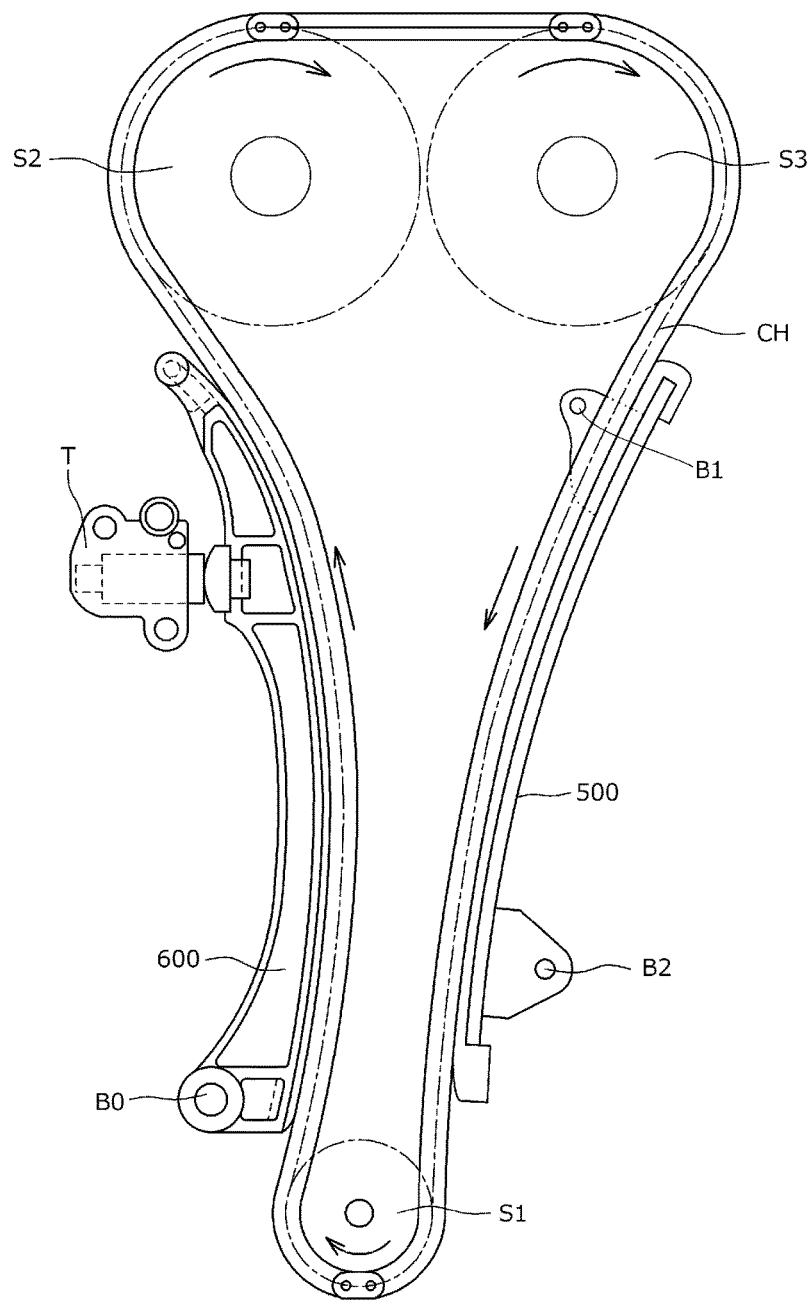
FIG. 64 is an explanatory view of a conventional timing system of an engine.
Figure 65:
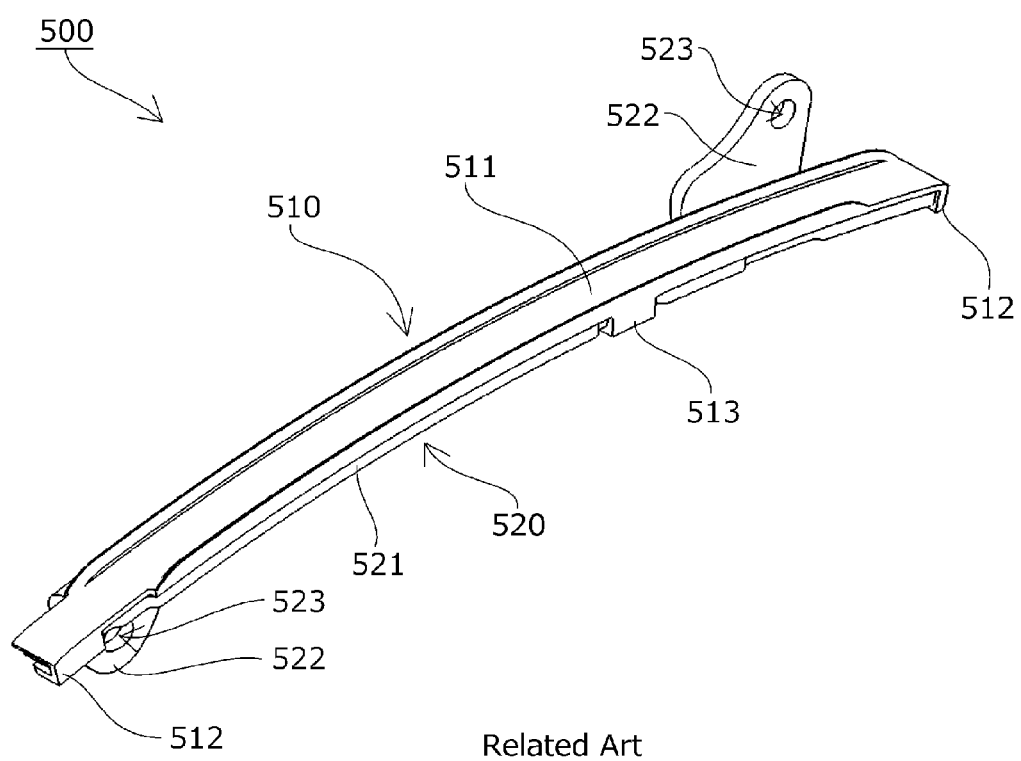
FIG. 65 is a perspective view of a conventional chain guide as viewed from above.
Figure 66:
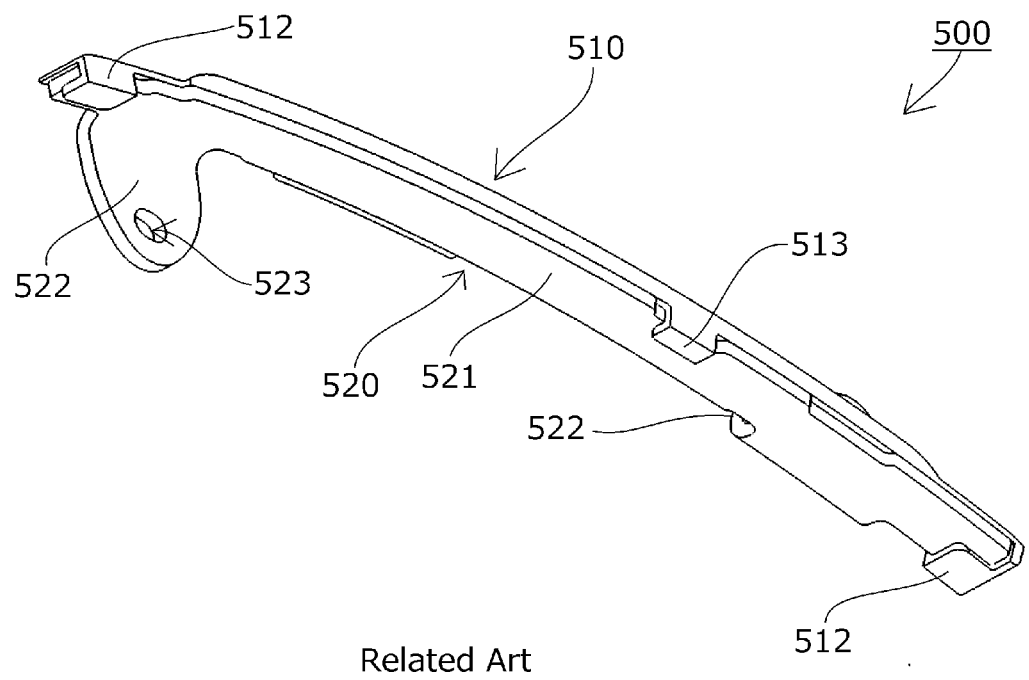
FIG. 66 is a perspective view of the conventional chain guide as viewed from below.
Figure 67:
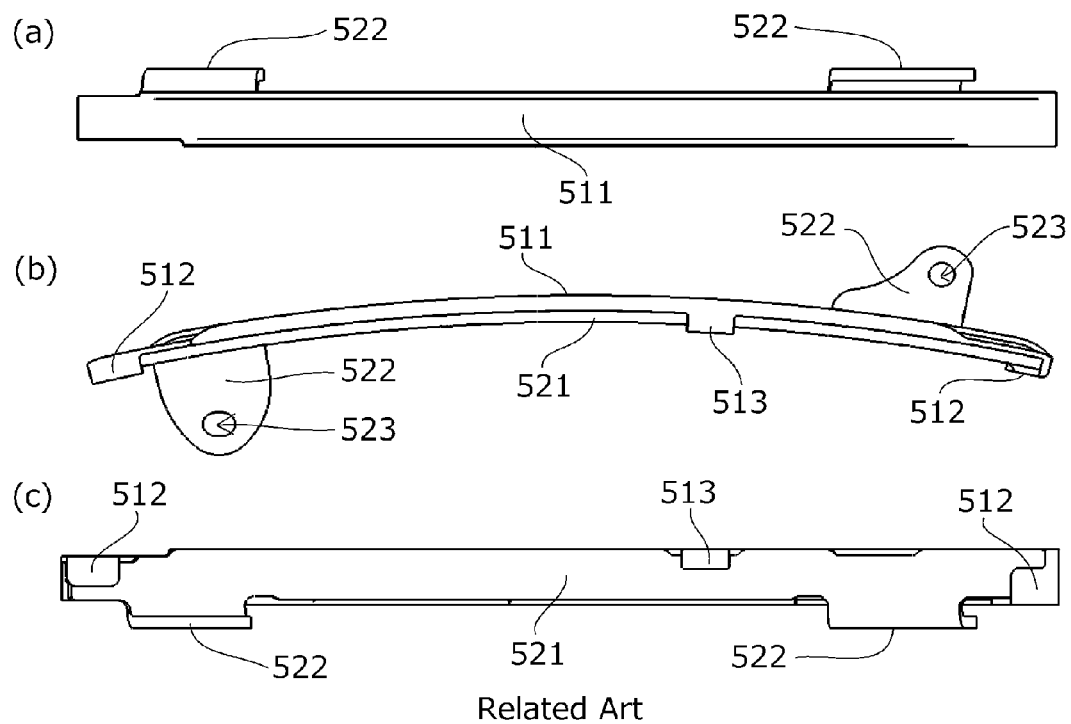
FIG. 67A is a plan view of the conventional chain guide.
FIG. 67B is a front view thereof.
FIG. 67C is a bottom view thereof.

In a chain guide 100A according to a modification of the first embodiment of the present invention, as shown in FIGS. 6 to 8, fixing pieces 132A of attachment members 130A are provided with filling holes 134 that are filled with the material of the guide shoe 110, and the configuration of the chain guide 100A is otherwise the same as that of the chain guide 100 according to the first embodiment described above (the same members as those of the chain guide 100 are designated by the same reference numerals, and the perspective views of the chain guide 100A are omitted because they are the same as those of the chain guide 100).

With this, when the guide shoe 110 is formed by injection molding or the like with the base member 120 and the fixing pieces 132A of the attachment members 130A inserted into the guide shoe 110, it is possible to obtain the chain guide 100A in which the guide shoe 110, the base member 120, and the attachment members 130A are fixed to each other more reliably, and achieve the same excellent operation and effect as those of the chain guide 100 according to the first embodiment.

Practical Example 3

In a chain guide 100B according to another modification of the first embodiment of the present invention, as shown in FIGS. 9 to 12, the base member 120 and the fixing pieces 132 of the attachment members 130 are fixed to and integrated with each other in advance by appropriate means such as spot welding or the like, a guide shoe 110B is engaged with the base member 120, and the guide shoe 110B, the base member 120, and the attachment members 130 are thereby integrally fixed to each other, and the configuration of the chain guide 100B is otherwise the same as that of the chain guide 100 according to the first embodiment described above (the same members as those of the chain guide 100 are designated by the same reference numerals).

In the guide shoe 110B of the present modification, similarly to the above-described known guide shoe 510, end engaging pieces 112 are provided at both ends in the chain traveling direction and a plurality of side engaging pieces 113 are provided at appropriate positions in a width direction, the end engaging pieces 112 and the side engaging pieces 113 are engaged with and disengaged from the base member 120, and the base member 120 integrally fixed to the attachment members 130 can be thereby attached to and detached from the guide shoe 110B.

With this, it is possible to select the optimum shapes and materials for the base member 120 and the attachment members 130 individually while adopting the conventional configuration for the guide shoe 110B, and achieve the same excellent operation and effect as those of the chain guide 100 according to the first embodiment.

Note that the end engaging pieces 112 may have the same structure or different structures, and the end engaging piece 112 may be provided only at one of the ends.

In addition, the number of the side engaging pieces 113, the positions thereof, and the structures thereof can be arbitrarily designed.

Practical Example 4

A chain guide 200 (fixed guide) according to a second embodiment of the present invention will be described based on the drawings.

Similarly to the chain guides (100, 100A, and 100B) according to the first embodiment of the present invention, the chain guide 200 is intended to be applied to the above-described known timing system, and includes a guide shoe 210 that slides and guides the traveling chain and a base member 220 that reinforces the guide shoe 210 along the chain traveling direction, as shown in FIGS. 13 to 17.

The base member 220 extends in the chain traveling direction, has a predetermined shape that is curved along the chain traveling direction, includes two beads 224 that extend in the chain traveling direction, and is formed, e.g., from one rolled steel sheet by punching.

Attachment members 230 are formed separately from the guide shoe 210 and the base member 220, and each of the attachment members 230 has an attachment portion 233, a fixing piece 232 that is bent by 90° with respect to the attachment portion 233 and extends, and a folded piece 236 that extends from the edge of the fixing piece 232 and is bent by 180°.

The attachment portion 233 is provided with an attachment hole 231 for fixation to the engine room or the like using the bolt or the like extended therethrough, and the attachment member 230 has three beads 235 that extend from the attachment portion 233 to the fixing piece 232.

The guide shoe 210 has a traveling guide portion 211 that extends in the chain traveling direction, and the chain guide 200 in which the guide shoe 210, the base member 220, and the attachment members 230 are integrally fixed to each other is configured by forming the guide shoe 210 by injection molding or the like with the base member 220 and the fixing pieces 232 and the folded pieces 236 of the attachment members 230 inserted into the guide shoe 210.

With the configuration described above, similarly to the first embodiment described above, it is possible to select the optimum shapes and materials for the guide shoe 210, the base member 220, and the attachment members 230 individually, and hence it is possible to reduce the manufacturing cost while sufficiently securing the strength, rigidity, and durability required by the entire chain guide 200.

In addition, it is not necessary to work the base member 220 such as bending the base member 220 or the like so that it is possible to reduce the number of working steps, it is possible to form the contour of the base member 220 into the shape having few protrusions so that the manufacture of the base member 220 is facilitated, and it is possible to reduce the waste of the material when the base member 220 is manufactured from one metal plate by punching or the like.

In addition, in the present embodiment, the base member 220 and the attachment members 230 have the beads 224 and 235, whereby it becomes possible to sufficiently secure the required strength, rigidity, and durability with a thinner material.

In a case where the beads 224 and 235 of the base member 220 and the attachment members 230 are manufactured from one metal plate by punching or the like, they can be formed at the same time as the punching.

Further, in the present embodiment, each of the attachment members 230 has the folded piece 236 that extends from the edge of the fixing piece 232 and is bent by 180°, whereby it becomes possible to hold the base member 220 between the fixing piece 232 and the folded piece 236 so that it is possible to fix the base member 220 and the attachment members 230 to each other before the formation of the guide shoe 210. With this, the manufacture is facilitated, and it becomes possible to integrally fix the guide shoe 210, the base member 220, and the attachment members 230 to each other more firmly.

When the base member 220 is held between the fixing piece 232 and the folded piece 236, they may also be fixed to each other by spot welding or the like.

Note that, similarly to the first embodiment, also in the present embodiment, the shapes of the left and right attachment members 230 and the shapes of the attachment holes 231 can be freely designed.

In addition, the specific shapes, numbers, and dimensions of the beads 224 and 235 of the base member 220 and the attachment members 230 can be freely designed.

Practical Example 5

In a chain guide 200A according to a modification of the second embodiment of the present invention, as shown in FIGS. 18 to 21, the base member 220 and the fixing pieces 232 of the attachment members 230 are fixed to and integrated with each other in advance by appropriate means such as spot welding or the like, a guide shoe 210A is engaged with the base member 220, and the guide shoe 210A, the base member 220, and the attachment members 230 are thereby integrally fixed to each other, and the configuration of the chain guide 200A is otherwise the same as that of the chain guide 200 according to the second embodiment described above (the same members as those of the chain guide 200 are designated by the same reference numerals).

In the guide shoe 210A of the present modification, similarly to the above-described known guide shoe 510, end engaging pieces 212 are provided at both ends in the chain traveling direction and a plurality of side engaging pieces 213 are provided at appropriate positions in the width direction, the end engaging pieces 212 and the side engaging pieces 213 are engaged with and disengaged from the base member 220, and the base member 220 integrally fixed to the attachment members 230 can be thereby attached to and detached from the guide shoe 210A.

With this, it is possible to select the optimum shapes and materials for the base member 220 and the attachment members 230 individually while adopting the conventional configuration for the guide shoe 210A, and achieve the same excellent operation and effect as those of the chain guide 200 according to the second embodiment.

Note that the end engaging pieces 212 may have the same structure or different structures, and the end engaging piece 212 may be provided only at one of the ends.

In addition, the number of the side engaging pieces 213, the positions thereof, and the structures thereof can be arbitrarily designed.

Practical Example 6

In a chain guide 200B according to another modification of the second embodiment of the present invention, as shown in FIGS. 22 to 25, each of attachment members 230B does not have the folded piece, the base member 220 and fixing pieces 232B of the attachment members 230B are fixed to and integrated with each other in advance by appropriate means such as spot welding or the like, a guide shoe 210B is engaged with the base member 220, and the guide shoe 210B, the base member 220, and the attachment members 230B are thereby integrally fixed to each other, and the configuration of the chain guide 200B is otherwise the same as that of the chain guide 200 according to the second embodiment described above (the same members as those of the chain guide 200 are designated by the same reference numerals).

In addition, the guide shoe 210B of the present modification is the same as the guide shoe 210A of the chain guide 200A according to the modification of the second embodiment of the present invention described above.

According to the present modification, each of the attachment members 230B does not have the folded piece, whereby the manufacture thereof is facilitated, its cost is reduced, and it is possible to achieve the same excellent operation and effect as those of the chain guide 200 according to the second embodiment.

Practical Example 7

In a chain guide 200C according to a third modification of the second embodiment of the present invention, as shown in FIGS. 26 to 29, each of attachment members 230C does not have the folded piece similarly to the configuration of the attachment member 230B of the chain guide 200B described above, a guide shoe 210C has the traveling guide portion 211 that extends in the chain traveling direction and is formed by injection molding or the like, with the base member 220 and the fixing pieces 232 of the attachment members 230C being inserted into the guide shoe 210C, and the configuration of the chain guide 200C is otherwise the same as that of the chain guide 200 according to the second embodiment described above (the same members as those of the chain guide 200 are designated by the same reference numerals).

According to the present modification, each of the attachment members 230C does not have the folded piece, whereby the manufacture thereof is facilitated, its cost is reduced, and it is possible to achieve the same excellent operation and effect as those of the chain guide 200 according to the second embodiment.

Practical Example 8

A chain guide 300 (fixed guide) according to a third embodiment of the present invention will be described based on the drawings.

Similarly to the chain guides (100, 100A, 100B, 200, 200A, 200B, and 200C) according to the first and second embodiments of the present invention, the chain guide 300 is intended to be applied to the above-described known timing system, and includes a guide shoe 310 that slides and guides the traveling chain and a base member 320 that reinforces the guide shoe 310 along the chain traveling direction, as shown in FIGS. 30 to 35.

The base member 320 extends in the chain traveling direction, has a predetermined shape that is curved along the chain traveling direction, includes two fixing protrusions 325 that protrude in the width direction, and is formed, e.g., from one rolled steel sheet by punching.

Attachment members 330 are formed separately from the guide shoe 310 and the base member 320, and have fixing holes 337 in which the fixing protrusions 325 of the base member 320 are fitted and attachment holes 331 for fixation to the engine room or the like using the bolt or the like extended therethrough.

Each of the fixing holes 337 is formed such that the fixing protrusion 325 of the base member 320 is tightly fitted in the fixing hole 337 when the fixing protrusion 325 is inserted into the fixing hole 337, and the attachment members 330 and the base member 320 are thereby integrally fixed to each other.

In the guide shoe 310, similarly to the above-described known guide shoe 510, end engaging pieces 312 are provided at both ends in the chain traveling direction, a plurality of side engaging pieces 313 are provided at appropriate positions in the width direction, the end engaging pieces 312 and the side engaging pieces 313 are engaged with and disengaged from the base member 320, and the base member 320 integrally fixed to the attachment members 330 can be thereby attached to and detached from the guide shoe 310.

With the configuration described above, similarly to the first and second embodiments described above, it is possible to select the optimum shapes and materials for the guide shoe 310, the base member 320, and the attachment members 330 individually, and hence it is possible to reduce the manufacturing cost while sufficiently securing the strength, rigidity, and durability required by the entire chain guide 300.

In addition, it is not necessary to work the base member 320 such as bending the base member 320 or the like so that it is possible to reduce the number of working steps, the manufacture of the base member 320 is facilitated, and it is possible to reduce the waste of the material when the base member 320 is manufactured from one metal plate by punching or the like.

Further, in the present embodiment, since the attachment members 330 and the base member 320 are fitted and fixed to each other, it becomes possible to integrally fix the guide shoe 310, the base member 320, and the attachment members 330 to each other more firmly.

Note that the attachment members 330 and the base member 320 may be fixed to each other further firmly by performing welding or swaging after the fitting step.

Furthermore, similarly to the first and second embodiments and the modifications thereof, also in the present embodiment, the shapes of the left and right attachment members 330 and the shapes of the attachment holes 331 can be freely designed.

Practical Example 9

In a chain guide 300A according to a modification of the third embodiment of the present invention, as shown in FIGS. 36 to 41, a base member 320A extends in the chain traveling direction, has a predetermined shape that is curved along the chain traveling direction, includes a fixing protrusion 325 that protrudes in the width direction and a fixing piece portion 326 that is provided with a fixing hole 327, and is formed, e.g., from one rolled steel sheet by punching.

One attachment member 330A (on the left side in the drawings) is formed separately from the guide shoe 310 and the base member 320A, and has a fixing protrusion 338 that is fitted in the fixing hole 327 provided in the fixing piece portion 326 of the base member 320A and the attachment hole 331 for fixation to the engine room or the like using the bolt or the like extended therethrough.

The other attachment member 330 (on the right side in the drawings) is formed separately from the guide shoe 310 and the base member 320A similarly to the third embodiment described above, and has a fixing hole 337 in which the fixing protrusion 325 of the base member 320A is fitted and the attachment hole 331 for fixation to the engine room or the like using the bolt or the like extended therethrough.

The fixing hole 337 of the attachment member 330 and the fixing hole 327 of the base member 320A are formed such that the fixing hole 337 thereof is tightly fitted to the fixing protrusion 325 of the base member 320A when the fixing protrusion 325 thereof is inserted into the fixing hole 337, the fixing hole 327 thereof is tightly fitted to the fixing protrusion 338 of the attachment member 330A when the fixing protrusion 338 thereof is inserted into the fixing hole 327, and the attachment members 330 and 330A and the base member 320A are thereby integrally fixed to each other.

The configuration of the chain guide 300A is otherwise the same as that of the chain guide 300 according to the third embodiment described above (the same members as those of the chain guide 300 are designated by the same reference numerals).

With the configuration described above, similarly to the second embodiment described above, it is possible to select the optimum shapes and materials for the guide shoe 310, the base member 320A, and the attachment members 330 and 330A individually, and hence it is possible to reduce the manufacturing cost while sufficiently securing the strength, rigidity, and durability required by the entire chain guide 300A.

In addition, it is not necessary to work the base member 320A such as bending the base member 320A or the like so that it is possible to reduce the number of working steps, the manufacture of the base member 320A is facilitated, and it is possible to reduce the waste of the material when the base member 320A is manufactured from one metal plate by punching or the like.

Further, in the present modification, similarly to the third embodiment described above, since the attachment members 330 and 330A and the base member 320A are fitted and fixed to each other, it becomes possible to integrally fix the guide shoe 310, the base member 320A, and the attachment members 330 and 330A to each other more firmly.

Note that the attachment members 330 and 330A and the base member 320A may be fixed to each other further firmly by performing welding or swaging after the fitting step.

Furthermore, similarly to the first to third embodiments and the modifications thereof, also in the present modification, the shapes of the left and right attachment members 330 and 330A and the shapes of the attachment holes 331 can be freely designed.

Practical Example 10

In a chain guide 300B according to another modification of the third embodiment of the present invention, as shown in FIGS. 42 to 46, the fixing hole 327 in which the attachment member 330A (on the left side in the drawings) of the base member 320B is fitted is provided at the center in the width direction, and the configuration of the chain guide 300B is otherwise the same as that of the chain guide 300A according to the modification of the third embodiment described above (the same members as those of the chain guide 300A are designated by the same reference numerals).

With the configuration described above, it is possible to achieve the same operation and effect as those of the chain guide 300A according to the modification of the third embodiment described above, and the attachment position of the attachment member 330A does not protrude in the width direction of the chain guide 300B so that it becomes possible to make the chain guide 300B compact to reduce the space occupied by the chain guide 300B in the engine room.

Practical Example 11

In a chain guide 300C according to a third modification of the third embodiment of the present invention, as shown in FIGS. 47 to 52, protruding fixing protrusions 325 and 325C are provided on both sides of a base member 320C in the width direction on the other side (on the right side in the drawings).

In addition, the other attachment member 330C is provided with the fixing hole 337 in which the fixing protrusion 325 is fitted, and has an extended piece portion 339 that is extended below the base member 320C and is provided with a fixing hole 337C in which the fixing protrusion 325C is fitted at its tip.

The configuration of the chain guide 300C is otherwise the same as that of the chain guide 300B according to another modification of the third embodiment described above (the same members as those of the chain guide 300B are designated by the same reference numerals).

With the configuration described above, it is possible to achieve the same operation and effect as those of the chain guide 300B according to another modification of the third embodiment described above and, since the attachment member 330C is fixed at both sides of the base member 320C in the width direction, it becomes possible to firmly fix the attachment member 330C even with a thin plate material, facilitate the working, and reduce the manufacturing cost.

Practical Example 12

In a chain guide 300D according to a fourth modification of the third embodiment of the present invention, as shown in FIGS. 53 to 58, the protruding fixing protrusions 325 and 325C are provided on both sides of the base member 320C in the width direction on the other side (on the right side in the drawings), similarly to the third modification described above.

The other attachment member 330D is provided with the fixing hole 337 in which the fixing protrusion 325 is fitted, and there is provided a second attachment member 340 that is extended above the guide shoe 310 to the other side in the width direction and has an attachment hole 341 that is aligned with the attachment hole 331 for fixation to the engine room or the like, and a fixing hole 347 in which the fixing protrusion 325C is fitted.

The configuration of the chain guide 300D is otherwise the same as that of the chain guide 300C according to the third modification of the third embodiment described above (the same members as those of the chain guide 300C are designated by the same reference numerals).

With the configuration described above, it is possible to achieve the same operation and effect as those of the chain guide 300C according to the third modification of the third embodiment described above, firm fixation is allowed even when the attachment member 330D and the second attachment member 340 are formed of a thin plate material, the working is facilitated and, since two plate materials are stacked in the vicinity of the attachment holes 331 and 341 as the attachment portions to the engine room or the like, it is possible to improve attachment strength.

In addition, since the attachment member 330D and the second attachment member 340 are positioned above and on the right and left of the guide shoe 310, even in a case where an abnormal vibration or flutter occurs in the traveling chain, it is possible to prevent the traveling chain from being detached from the guide shoe 310.

Note that the attachment member 330D and the second attachment member 340 may also be fixed to each other by welding or the like before the attachment to the engine room or the like, and may also be clamped together with the bolt or the like at the time of the attachment.

Practical Example 13

In a chain guide 300E according to a fifth modification of the third embodiment of the present invention, as shown in FIGS. 59 to 63, the protruding fixing protrusions 325 and 325C are provided on both sides of the base member 320C in the width direction on the other side (on the right side in the drawings) similarly to the third and fourth modifications described above.

The other attachment member 330E is formed into an inverted U shape so as to be extended above the guide shoe 310 in the width direction, and the attachment member 330E is provided with attachment holes 331 and 331E in both side surfaces in the width direction, the fixing hole 337 in which the fixing protrusion 325 is fitted, and a fixing hole 337E in which the fixing protrusion 325C is fitted.

The configuration of the chain guide 300E is otherwise the same as that of each of the chain guides 300C and 300D of the third and fourth modifications of the third embodiment described above (the same members as those of the chain guides 300C and 300D are designated by the same reference numerals).

With the configuration described above, it is possible to achieve the same operation and effect as those of the chain guide 300C according to the fourth modification of the third embodiment described above, firm fixation is allowed even when the attachment member 330E is formed of the thin plate material, the working is facilitated and, since the attachment holes 331 and 331E as the attachment portions to the engine room or the like are spaced apart from each other in the width direction, it becomes possible to suppress the change of an attitude by fixing the attachment holes 331 and 331E using pins, bolts, or the like.

Although each of the embodiments and the modifications described above is the specific example of the chain guide according to the present invention, the chain guide according to the present invention is not limited thereto, and various changes of the shapes, positions, dimensions, and dispositions of the constituent members can be made.

For example, as shown in the drawings, although lips for regulating the widthwise movement of the chain are provided on both sides of the surface of the traveling guide portion, the lip may be provided at any position, the height of the lip and the length thereof in the chain traveling direction may have any values, and the lips may be provided at intervals in the chain traveling direction.

In addition, although each of the embodiments and the modifications is provided in the engine having the timing system, each of the embodiments and the modifications is not limited thereto, and can be applied to various equipment.

Further, the chain guide according to the present invention is not limited to the transmission mechanism using the chain. The chain guide according to the present invention may be applied to similar transmission mechanisms using a belt, a rope, and the like, and can be used in various industrial fields.

What is claimed is:

1. A chain guide, comprising:
   a guide shoe that slides and guides a traveling chain;
   a base member that reinforces the guide shoe along a chain traveling direction;
   at least one attachment member that is provided with an attachment hole, the attachment member being a rigid member having a thin sheet-shape fixing piece and a thin sheet-shape attachment portion together forming an L-shape with a plane of the thin sheet-shape fixing piece being transverse to a plane of the thin sheet-shape attachment portion, wherein the thin sheet-shape attachment portion is provided with the attachment hole and the attachment hole has a center axis extending transverse to the chain traveling direction without passing through said guide shoe or base member;
   the thin sheet-shaped attachment portion is provided separately from the guide shoe and the base member and integrally fixed via the thin sheet-shaped fixing piece to at least one of the guide shoe and the base member or both of the guide shoe and the base member.

2. The chain guide according to claim 1, wherein the guide shoe is formed of a synthetic resin material, and the base member and the attachment member are formed of a metal material.

3. The chain guide according to claim 1, wherein the fixing piece is integrally fixed to at least one of the guide shoe and the base member or both of the guide shoe and the base member by welding.

4. The chain guide according to claim 3, wherein the fixing piece is formed to hold at least one of the guide shoe and the base member.

5. The chain guide according to claim 3, wherein at least one of the guide shoe and the base member or both of the guide shoe and the base member are formed to hold the fixing piece.

6. The chain guide according to claim 1, wherein one of the attachment portion and the base member has a fixing hole, and the other of the attachment portion and the base member has a fixing protrusion that is inserted into the fixing hole.

7. The chain guide according to claim 1, wherein the attachment member is integrated with the guide shoe when the guide shoe is manufactured.

8. The chain guide according to claim 1, wherein the attachment member is formed by combining a plurality of components.

9. The chain guide according to claim 1, wherein the base member is formed from a thin sheet-shaped material, and has a bead.

10. The chain guide according to claim 1, wherein the attachment portion has a bead.

11. The chain guide according to claim 1, wherein said attachment hole extends through said attachment portion and is configured to receive a mounting bolt.

12. The chain guide according to claim 1, wherein the attachment member is formed from a single, bent, thin sheet of material.

13. The chain guide according to claim 1, wherein the attachment member is formed from a single, bent, thin sheet of material.

14. A method of making a chain guide, comprising:
providing a guide shoe that is configured to slide and guide a traveling chain;
providing a base member that is configured to reinforce the guide shoe along a chain traveling direction;
selecting at least one rigid attachment member that is separate from the guide shoe and the base member and that includes an attachment portion having an attachment hole and a fixing piece;
integrally fixing the at least one attachment member via the fixing piece to at least one of the guide shoe and the base member or both of the guide shoe and the base member; and
further including providing the attachment member as a rigid member, wherein the fixing piece is a thin sheet and the attachment portion is a thin sheet and wherein the fixing piece and the attachment portion together form an L-shape with a plane of the thin sheet-shape fixing piece being transverse to a plane of the thin sheet-shape attachment portion, and wherein the attachment hole has a center axis extending transverse to the chain traveling direction without passing through said guide shoe or base member.

15. The method of making a chain guide according to claim 14, wherein said selecting at least one rigid attachment member includes selecting a shape or a material of the at least one attachment member.

16. The method of making a chain guide according to claim 14, wherein the step of integrally fixing includes welding.

17. The method of making a chain guide according to claim 14, further including forming the attachment member, the base member and the guide show together after said integrally fixing.

18. The method of claim 14, further including forming the attachment member from a single, bent, thin sheet of material.

19. A chain guide, comprising:
a guide shoe that slides and guides a traveling chain along a traveling guide portion of the guide shoe;
a base member that reinforces the guide shoe along a chain traveling direction;
at least one attachment member that is provided with an attachment hole, the attachment member being a rigid member having a thin sheet-shape fixing piece and a thin sheet-shape attachment portion together forming an L-shape with a plane of the thin sheet-shape fixing piece being transverse to a plane of the thin sheet-shape attachment portion, wherein the plane of the sheet shaped fixing piece is generally parallel to a surface of the traveling guide portion of the guide shoe, and wherein the thin sheet-shape attachment portion is provided with the attachment hole and the attachment hole has a center axis extending transverse to the chain traveling direction without passing through said guide shoe or base member;
the thin sheet-shaped attachment portion is provided separately from the guide shoe and the base member and integrally fixed via the thin sheet-shaped fixing piece to at least one of the guide shoe and the base member or both of the guide shoe and the base member.

* * * * *